United States Patent
Johnson et al.

(10) Patent No.: US 10,080,991 B2
(45) Date of Patent: Sep. 25, 2018

(54) APPARATUS AND SYSTEM FOR SWING ADSORPTION PROCESSES RELATED THERETO

(71) Applicants: Robert A. Johnson, Doylestown, PA (US); Harry W. Deckman, Clinton, NJ (US); Bruce T. Kelley, Porter, TX (US); Russell H. Oelfke, Houston, TX (US); Shwetha Ramkumar, Cypress, TX (US)

(72) Inventors: Robert A. Johnson, Doylestown, PA (US); Harry W. Deckman, Clinton, NJ (US); Bruce T. Kelley, Porter, TX (US); Russell H. Oelfke, Houston, TX (US); Shwetha Ramkumar, Cypress, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 79 days.

(21) Appl. No.: 15/233,617

(22) Filed: Aug. 10, 2016

(65) Prior Publication Data
US 2017/0056810 A1  Mar. 2, 2017

Related U.S. Application Data

(60) Provisional application No. 62/213,262, filed on Sep. 2, 2015.

(51) Int. Cl.
*B01D 53/04* (2006.01)
*C10L 3/10* (2006.01)
*B01D 53/047* (2006.01)

(52) U.S. Cl.
CPC ....... *B01D 53/0462* (2013.01); *B01D 53/047* (2013.01); *B01D 53/0407* (2013.01);
(Continued)

(58) Field of Classification Search
CPC ............ B01D 53/0407; B01D 53/0462; B01D 53/047; B01D 53/0473; B01D 2253/108;
(Continued)

(56) References Cited

U.S. PATENT DOCUMENTS

| | | |
|---|---|---|
| 1,868,138 A | 7/1932 | Fisk |
| 3,103,425 A | 9/1963 | Meyer ............................ 55/62 |

(Continued)

FOREIGN PATENT DOCUMENTS

| | | |
|---|---|---|
| CA | 2297590 | 9/2000 |
| CA | 2237103 | 12/2001 |

(Continued)

OTHER PUBLICATIONS

Conviser, S. A. (1964) "Removal of $CO_2$ from Natural Gas With Molecular Sieves," *Proceedings of the Gas Conditioning Conf. Univ. of Oklahoma*, pp. 1F-12F.

(Continued)

*Primary Examiner* — Frank Lawrence
(74) *Attorney, Agent, or Firm* — ExxonMobil Upstream Research Company-Law Department

(57) ABSTRACT

Provided are apparatus and systems for performing a swing adsorption process. This swing adsorption process may involve passing streams through adsorbent bed units to remove contaminants, such as water, from the stream. As part of the process, the adsorbent bed unit is purged with a purge stream that is provided at a temperature less than 450° F. The de-contaminated stream may be used with a liquefied natural gas (LNG) plant or other subsequent process requiring a de-contaminated stream. The swing adsorption process may involve a combined TSA and PSA process, which is utilized to remove contaminants from the feed stream.

21 Claims, 4 Drawing Sheets

(52) U.S. Cl.
CPC .... *B01D 53/0473* (2013.01); *B01D 2253/108* (2013.01); *B01D 2253/116* (2013.01); *B01D 2256/24* (2013.01); *B01D 2256/245* (2013.01); *B01D 2257/304* (2013.01); *B01D 2257/40* (2013.01); *B01D 2257/504* (2013.01); *B01D 2257/80* (2013.01); *B01D 2259/4009* (2013.01); *B01D 2259/40013* (2013.01); *B01D 2259/40043* (2013.01); *B01D 2259/40054* (2013.01); *B01D 2259/4062* (2013.01); *B01D 2259/40086* (2013.01); *B01D 2259/416* (2013.01); *C10L 3/104* (2013.01); *C10L 3/106* (2013.01); *C10L 2290/543* (2013.01); *Y02C 10/08* (2013.01)

(58) Field of Classification Search
CPC .......... B01D 2253/116; B01D 2256/24; B01D 2256/245; B01D 2257/304; B01D 2257/40; B01D 2257/504; B01D 2257/80; B01D 2259/40013; B01D 2259/40086; B01D 2259/40054; B01D 2259/4009; B01D 2259/4062; B01D 2259/416; Y02C 10/08
USPC .............. 95/96–99, 104–106, 117, 122–124; 96/108, 121, 126–128, 143, 144
See application file for complete search history.

(56) References Cited

U.S. PATENT DOCUMENTS

| | | | |
|---|---|---|---|
| 3,124,152 A | 3/1964 | Payne | 137/269.5 |
| 3,142,547 A | 7/1964 | Marsh et al. | 55/26 |
| 3,508,758 A | 4/1970 | Strub | 277/15 |
| 3,602,247 A | 8/1971 | Bunn et al. | 137/270 |
| 3,788,036 A | 1/1974 | Lee et al. | 55/25 |
| 3,967,464 A | 7/1976 | Cormier et al. | 62/13 |
| 4,187,092 A | 2/1980 | Woolley | 62/48 |
| 4,261,815 A | 4/1981 | Kelland | 209/213 |
| 4,324,565 A | 4/1982 | Benkmann | 55/23 |
| 4,325,565 A | 4/1982 | Winchell | 280/282 |
| 4,329,162 A | 5/1982 | Pitcher | 55/523 |
| 4,340,398 A | 7/1982 | Doshi et al. | 55/25 |
| 4,386,947 A | 6/1983 | Mizuno et al. | 55/387 |
| 4,445,441 A | 5/1984 | Tanca | 110/165 |
| 4,461,630 A | 7/1984 | Cassidy et al. | 55/25 |
| 4,496,376 A | 1/1985 | Hradek | 55/163 |
| 4,705,627 A | 11/1987 | Miwa et al. | 210/264 |
| 4,711,968 A | 12/1987 | Oswald et al. | 568/454 |
| 4,737,170 A | 4/1988 | Searle | 55/179 |
| 4,770,676 A | 9/1988 | Sircar et al. | 55/26 |
| 4,783,205 A | 11/1988 | Searle | 55/161 |
| 4,784,672 A | 11/1988 | Sircar | 55/26 |
| 4,790,272 A | 12/1988 | Woolenweber | 123/188 |
| 4,814,146 A | 3/1989 | Brand et al. | 422/179 |
| 4,816,039 A | 3/1989 | Krishnamurthy et al. | 55/26 |
| 4,877,429 A | 10/1989 | Hunter | 55/162 |
| 4,977,745 A | 12/1990 | Heichberger | 62/10 |
| 5,110,328 A | 5/1992 | Yokota et al. | 55/180 |
| 5,125,934 A | 6/1992 | Krishnamurthy et al. | 55/25 |
| 5,169,006 A | 12/1992 | Stelzer | 209/223.1 |
| 5,174,796 A | 12/1992 | Davis et al. | 55/26 |
| 5,224,350 A | 7/1993 | Mehra | 62/17 |
| 5,234,472 A | 8/1993 | Krishnamurthy et al. | 95/98 |
| 5,292,990 A | 3/1994 | Kantner et al. | 585/820 |
| 5,306,331 A | 4/1994 | Auvil et al. | 95/42 |
| 5,354,346 A | 10/1994 | Kumar | 95/101 |
| 5,365,011 A | 11/1994 | Ramachandran et al. | 585/829 |
| 5,370,728 A | 12/1994 | LaSala et al. | 95/101 |
| 5,486,227 A | 1/1996 | Kumar et al. | |
| 5,547,641 A | 8/1996 | Smith et al. | 422/181 |
| 5,565,018 A | 10/1996 | Baksh et al. | 95/100 |
| 5,672,196 A | 9/1997 | Acharya et al. | 95/97 |
| 5,700,310 A | 12/1997 | Bowman et al. | 95/45 |
| 5,733,451 A | 3/1998 | Coellner et al. | 210/496 |
| 5,735,938 A | 4/1998 | Baksh et al. | 95/101 |
| 5,750,026 A | 5/1998 | Gadkaree et al. | 201/502.1 |
| 5,769,928 A | 6/1998 | Leavitt | |
| 5,792,239 A | 8/1998 | Reinhold, III et al. | 95/101 |
| 5,807,423 A | 9/1998 | Lemcoff et al. | 95/96 |
| 5,811,616 A | 9/1998 | Holub et al. | 585/504 |
| 5,827,358 A | 10/1998 | Kulish et al. | 96/115 |
| 5,906,673 A | 5/1999 | Reinhold, III et al. | 95/45 |
| 5,912,426 A | 6/1999 | Smolarek et al. | |
| 5,924,307 A | 7/1999 | Nenov | 62/643 |
| 5,935,444 A | 8/1999 | Johnson et al. | 210/691 |
| 5,968,234 A | 10/1999 | Midgett, II et al. | 95/120 |
| 5,976,221 A | 11/1999 | Bowman et al. | 95/45 |
| 5,997,617 A | 12/1999 | Czabala et al. | 96/130 |
| 6,007,606 A | 12/1999 | Baksh et al. | 95/98 |
| 6,011,192 A | 1/2000 | Baker et al. | 585/818 |
| 6,023,942 A | 2/2000 | Thomas et al. | 62/613 |
| 6,053,966 A | 4/2000 | Moreau et al. | 95/96 |
| 6,063,161 A | 5/2000 | Keefer et al. | 95/100 |
| 6,096,115 A | 8/2000 | Kleinberg | |
| 6,099,621 A | 8/2000 | Ho | 95/139 |
| 6,129,780 A | 10/2000 | Millet et al. | 95/117 |
| 6,136,222 A | 10/2000 | Friesen et al. | 252/184 |
| 6,147,126 A | 11/2000 | DeGeorge et al. | 518/715 |
| 6,152,991 A | 11/2000 | Ackley | |
| 6,156,101 A | 12/2000 | Naheiri | |
| 6,171,371 B1 | 1/2001 | Derive et al. | 95/98 |
| 6,176,897 B1 | 1/2001 | Keefer | 95/98 |
| 6,179,900 B1 | 1/2001 | Behling et al. | 95/45 |
| 6,183,538 B1 | 2/2001 | Naheiri | |
| 6,194,079 B1 | 2/2001 | Hekal | 428/566 |
| 6,210,466 B1 | 4/2001 | Whysall et al. | 95/100 |
| 6,231,302 B1 | 5/2001 | Bonardi | 415/105 |
| 6,245,127 B1 | 6/2001 | Kane et al. | 95/101 |
| 6,284,021 B1 | 9/2001 | Lu et al. | 95/96 |
| 6,311,719 B1 | 11/2001 | Hill et al. | 137/312 |
| 6,322,612 B1 * | 11/2001 | Sircar | B01D 53/047 95/104 |
| 6,345,954 B1 | 2/2002 | Al-Himyary et al. | 415/112 |
| 6,398,853 B1 | 6/2002 | Keefer et al. | 96/125 |
| 6,402,813 B2 | 6/2002 | Monereau et al. | 95/96 |
| 6,406,523 B1 | 6/2002 | Connor et al. | 96/125 |
| 6,425,938 B1 | 7/2002 | Xu et al. | |
| 6,432,379 B1 | 8/2002 | Heung | 423/648.1 |
| 6,436,171 B1 | 8/2002 | Wang et al. | 95/96 |
| 6,444,012 B1 | 9/2002 | Dolan et al. | 95/99 |
| 6,444,014 B1 | 9/2002 | Mullhaupt et al. | 95/130 |
| 6,444,523 B1 | 9/2002 | Fan et al. | 438/257 |
| 6,451,095 B1 | 9/2002 | Keefer et al. | 96/125 |
| 6,457,485 B2 | 10/2002 | Hill et al. | 137/240 |
| 6,471,939 B1 | 10/2002 | Boix et al. | 423/706 |
| 6,488,747 B1 | 12/2002 | Keefer | 96/125 |
| 6,497,750 B2 | 12/2002 | Butwell et al. | 95/96 |
| 6,500,234 B1 | 12/2002 | Ackley et al. | |
| 6,500,241 B2 | 12/2002 | Reddy | 96/134 |
| 6,500,404 B1 | 12/2002 | Camblor Fernandez et al. | 423/706 |
| 6,503,299 B2 | 1/2003 | Baksh et al. | 95/98 |
| 6,506,351 B1 | 1/2003 | Jain et al. | 423/239.1 |
| 6,514,318 B2 | 2/2003 | Keefer | 95/96 |
| 6,514,319 B2 | 2/2003 | Keefer et al. | 95/101 |
| 6,517,609 B1 | 2/2003 | Monereau et al. | 95/96 |
| 6,531,516 B2 | 3/2003 | Davis et al. | 518/700 |
| 6,533,846 B1 | 3/2003 | Keefer et al. | 96/125 |
| 6,565,627 B1 | 5/2003 | Golden et al. | 95/96 |
| 6,565,635 B2 | 5/2003 | Keefer et al. | 96/125 |
| 6,565,825 B2 | 5/2003 | Ohji et al. | 423/625 |
| 6,572,678 B1 | 6/2003 | Wijmans et al. | 95/47 |
| 6,579,341 B2 | 6/2003 | Baker et al. | 95/39 |
| 6,593,541 B1 | 7/2003 | Herren | 219/121.67 |
| 6,595,233 B2 | 7/2003 | Pulli | 137/115.05 |
| 6,605,136 B1 | 8/2003 | Graham et al. | 95/98 |
| 6,607,584 B2 | 8/2003 | Moreau et al. | 95/117 |
| 6,630,012 B2 | 10/2003 | Wegeng et al. | 95/106 |
| 6,631,626 B1 | 10/2003 | Hahn | 62/612 |
| 6,641,645 B1 | 11/2003 | Lee et al. | 95/98 |
| 6,651,645 B1 | 11/2003 | Nunez-Suarez | 126/9 R |
| 6,660,064 B2 | 12/2003 | Golden et al. | 95/96 |

(56) References Cited

U.S. PATENT DOCUMENTS

| | | | |
|---|---|---|---|
| 6,660,065 B2 | 12/2003 | Byrd et al. ............... 95/117 |
| 6,692,626 B2 | 2/2004 | Keefer et al. ............. 204/491 |
| 6,712,087 B2 | 3/2004 | Hill et al. ................. 137/240 |
| 6,742,507 B2 | 6/2004 | Keefer et al. ............. 123/585 |
| 6,746,515 B2 | 6/2004 | Wegeng et al. ............. 95/96 |
| 6,752,852 B1 | 6/2004 | Jacksier et al. ........... 95/117 |
| 6,770,120 B2 | 8/2004 | Neu et al. ................... 95/96 |
| 6,773,225 B2 | 8/2004 | Yuri et al. .................. 415/1 |
| 6,802,889 B2 | 10/2004 | Graham et al. ............. 95/96 |
| 6,814,771 B2 | 11/2004 | Scardino et al. ......... 55/385.3 |
| 6,835,354 B2 | 12/2004 | Woods et al. ............. 422/139 |
| 6,840,985 B2 | 1/2005 | Keefer ....................... 96/125 |
| 6,866,950 B2 | 3/2005 | Connor et al. ............. 429/13 |
| 6,889,710 B2 | 5/2005 | Wagner ................ 137/625.46 |
| 6,890,376 B2 | 5/2005 | Arquin et al. .............. 96/134 |
| 6,893,483 B2 | 5/2005 | Golden et al. ............... 95/96 |
| 6,902,602 B2 | 6/2005 | Keefer et al. ............... 95/97 |
| 6,916,358 B2 | 7/2005 | Nakamura et al. ........... 95/96 |
| 6,918,953 B2 | 7/2005 | Lomax, Jr. et al. ........ 96/130 |
| 6,921,597 B2 | 7/2005 | Keefer et al. ............... 429/34 |
| 6,974,496 B2 | 12/2005 | Wegeng et al. ............ 96/126 |
| 7,025,801 B2 | 4/2006 | Monereau ..................... 95/8 |
| 7,027,929 B2 | 4/2006 | Wang ......................... 702/17 |
| 7,029,521 B2 | 4/2006 | Johansson .................. 96/128 |
| 7,074,323 B2 | 7/2006 | Ghijsen ..................... 208/101 |
| 7,077,891 B2 | 7/2006 | Jaffe et al. ................. 96/108 |
| 7,087,331 B2 | 8/2006 | Keefer et al. ............... 429/17 |
| 7,094,275 B2 | 8/2006 | Keefer et al. ............... 96/125 |
| 7,097,925 B2 | 8/2006 | Keefer et al. ............... 429/9 |
| 7,112,239 B2 | 9/2006 | Kimbara et al. ............ 96/108 |
| 7,117,669 B2 | 10/2006 | Kaboord et al. ............ 60/288 |
| 7,122,073 B1 | 10/2006 | Notaro et al. |
| 7,128,775 B2 | 10/2006 | Celik et al. ................. 95/96 |
| 7,144,016 B2 | 12/2006 | Gozdawa ................... 277/399 |
| 7,160,356 B2 | 1/2007 | Koros et al. ................ 95/50 |
| 7,160,367 B2 | 1/2007 | Babicki et al. ............. 96/116 |
| 7,166,149 B2 | 1/2007 | Dunne et al. .............. 95/113 |
| 7,172,645 B1 | 2/2007 | Pfister et al. ............... 95/116 |
| 7,189,280 B2 | 3/2007 | Alizadeh-Khiavi et al. ... 95/130 |
| 7,250,073 B2 | 7/2007 | Keefer et al. ............... 95/96 |
| 7,250,074 B2 | 7/2007 | Tonkovich et al. ........ 95/130 |
| 7,255,727 B2 | 8/2007 | Monereau et al. ........... 95/96 |
| 7,258,725 B2 | 8/2007 | Ohmi et al. ................. 95/41 |
| 7,276,107 B2 | 10/2007 | Baksh et al. ................ 95/96 |
| 7,279,029 B2 | 10/2007 | Occhialini et al. ........ 96/121 |
| 7,285,350 B2 | 10/2007 | Keefer et al. ............... 429/34 |
| 7,297,279 B2 | 11/2007 | Johnson et al. ............ 210/669 |
| 7,311,763 B2 | 12/2007 | Neary ........................ 96/121 |
| RE40,006 E | 1/2008 | Keefer et al. .............. 95/100 |
| 7,314,503 B2 | 1/2008 | Landrum et al. ............ 95/50 |
| 7,354,562 B2 | 4/2008 | Ying et al. ............... 423/437.2 |
| 7,387,849 B2 | 6/2008 | Keefer et al. ............... 429/34 |
| 7,390,350 B2 | 6/2008 | Weist, Jr. et al. .......... 95/100 |
| 7,404,846 B2 | 7/2008 | Golden et al. ............. 95/103 |
| 7,438,079 B2 | 10/2008 | Cohen et al. |
| 7,449,049 B2 | 11/2008 | Thomas et al. ............ 95/123 |
| 7,456,131 B2 | 11/2008 | Klett et al. ................. 502/417 |
| 7,510,601 B2 | 3/2009 | Whitley et al. ............ 96/121 |
| 7,527,670 B2 | 5/2009 | Ackley et al. ............... 95/96 |
| 7,553,568 B2 | 6/2009 | Keefer ....................... 429/13 |
| 7,578,864 B2 | 8/2009 | Watanabe et al. ......... 55/523 |
| 7,604,682 B2 | 10/2009 | Seaton ........................ 95/96 |
| 7,637,989 B2 | 12/2009 | Bong ......................... 96/130 |
| 7,641,716 B2 | 1/2010 | Lomax, Jr. et al. .......... 95/96 |
| 7,645,324 B2 | 1/2010 | Rode et al. .................. 95/96 |
| 7,651,549 B2 | 1/2010 | Whitley ...................... 95/96 |
| 7,674,319 B2 | 3/2010 | Lomax, Jr. et al. .......... 95/19 |
| 7,674,539 B2 | 3/2010 | Keefer et al. ............... 429/17 |
| 7,687,044 B2 | 3/2010 | Keefer et al. ............. 422/211 |
| 7,713,333 B2 | 5/2010 | Rege et al. .................. 95/96 |
| 7,717,981 B2 | 5/2010 | LaBuda et al. ............. 95/96 |
| 7,722,700 B2 | 5/2010 | Sprinkle ..................... 95/22 |
| 7,731,782 B2 | 6/2010 | Kelley et al. .............. 95/139 |
| 7,740,687 B2 | 6/2010 | Reinhold, III ............... 95/96 |
| 7,744,676 B2 | 6/2010 | Leitmayr et al. ............ 95/99 |
| 7,744,677 B2 | 6/2010 | Barclay et al. ............. 95/114 |
| 7,758,051 B2 | 7/2010 | Roberts-Haritonov et al. ............ 277/401 |
| 7,758,988 B2 | 7/2010 | Keefer et al. ............... 429/34 |
| 7,763,098 B2 | 7/2010 | Alizadeh-Khiavi et al. ..... 95/96 |
| 7,763,099 B2 | 7/2010 | Verma et al. ................ 95/96 |
| 7,792,983 B2 | 9/2010 | Mishra et al. ............. 709/231 |
| 7,793,675 B2 | 9/2010 | Cohen et al. |
| 7,806,965 B2 | 10/2010 | Stinson ..................... 95/187 |
| 7,819,948 B2 | 10/2010 | Wagner ..................... 95/100 |
| 7,828,877 B2 | 11/2010 | Sawada et al. .............. 95/96 |
| 7,828,880 B2 | 11/2010 | Moriya et al. ............. 95/210 |
| 7,854,793 B2 | 12/2010 | Rarig et al. ................ 96/116 |
| 7,858,169 B2 | 12/2010 | Yamashita ................. 428/116 |
| 7,862,645 B2 | 1/2011 | Whitley et al. ............. 95/96 |
| 7,867,320 B2 | 1/2011 | Baksh et al. ................ 95/96 |
| 7,902,114 B2 | 3/2011 | Bowie et al. |
| 7,938,886 B2 | 5/2011 | Hershkowitz et al. ......... 95/115 |
| 7,947,118 B2 | 5/2011 | Rarig et al. ................. 95/98 |
| 7,947,120 B2 | 5/2011 | Deckman et al. .......... 95/139 |
| 7,959,720 B2 | 6/2011 | Deckman et al. .......... 96/130 |
| 8,016,918 B2 | 9/2011 | LaBuda et al. ............. 95/96 |
| 8,034,164 B2 | 10/2011 | Lomax, Jr. et al. ........ 95/121 |
| 8,071,063 B2 | 12/2011 | Reyes et al. ............... 423/248 |
| 8,128,734 B2 | 3/2012 | Song ........................... 95/96 |
| 8,142,745 B2 | 3/2012 | Reyes et al. ............. 423/213.2 |
| 8,142,746 B2 | 3/2012 | Reyes et al. ............. 423/213.2 |
| 8,192,709 B2 | 6/2012 | Reyes et al. ............. 423/245.1 |
| 8,210,772 B2 | 7/2012 | Gillecriosd .............. 405/128.2 |
| 8,227,121 B2 | 7/2012 | Adams et al. ............. 429/429 |
| 8,262,773 B2 | 9/2012 | Northrop et al. ........... 95/114 |
| 8,262,783 B2 | 9/2012 | Stoner et al. .............. 96/108 |
| 8,268,043 B2 | 9/2012 | Celik et al. ................. 95/96 |
| 8,268,044 B2 | 9/2012 | Wright et al. ............... 95/96 |
| 8,272,401 B2 | 9/2012 | McLean ................ 137/625.11 |
| 8,287,629 B2 | 10/2012 | Fujita et al. ................ 96/126 |
| 8,319,090 B2 | 11/2012 | Kitamura ................... 136/244 |
| 8,337,594 B2 | 12/2012 | Corma Canos et al. ........ 95/130 |
| 8,361,200 B2 | 1/2013 | Sayari et al. ............... 95/139 |
| 8,361,205 B2 | 1/2013 | Desai et al. ................ 96/121 |
| 8,377,173 B2 | 2/2013 | Chuang ...................... 95/135 |
| 8,444,750 B2 | 5/2013 | Deckman et al. ............ 95/96 |
| 8,470,395 B2 | 6/2013 | Khiavi et al. ............. 427/180 |
| 8,480,795 B2 | 7/2013 | Siskin et al. ................ 95/235 |
| 8,512,569 B2 | 8/2013 | Eaton et al. ............... 210/650 |
| 8,518,356 B2 | 8/2013 | Schaffer et al. ........... 423/220 |
| 8,529,662 B2 | 9/2013 | Kelley et al. ................ 95/96 |
| 8,529,663 B2 | 9/2013 | Reyes et al. ................. 95/96 |
| 8,529,664 B2 | 9/2013 | Deckman et al. ............ 95/96 |
| 8,529,665 B2 | 9/2013 | Manning et al. ............ 95/96 |
| 8,535,414 B2 | 9/2013 | Johnson et al. ............. 95/95 |
| 8,545,602 B2 | 10/2013 | Chance et al. .............. 95/96 |
| 8,551,444 B2 | 10/2013 | Agnihotri et al. ......... 423/648.1 |
| 8,573,124 B2 | 11/2013 | Havran et al. ............. 102/206 |
| 8,591,627 B2 | 11/2013 | Jain ............................ 95/52 |
| 8,591,634 B2 | 11/2013 | Winchester et al. ......... 96/127 |
| 8,616,233 B2 | 12/2013 | McLean et al. ......... 137/246.22 |
| 8,657,922 B2 | 2/2014 | Yamawaki et al. ........... 95/96 |
| 8,673,059 B2 | 3/2014 | Leta et al. .................. 95/104 |
| 8,680,344 B2 | 3/2014 | Weston et al. |
| 8,715,617 B2 | 5/2014 | Genkin et al. ............. 423/652 |
| 8,752,390 B2 | 6/2014 | Wright et al. ............... 60/780 |
| 8,778,051 B2 | 7/2014 | Weist, Jr. et al. ........... 95/98 |
| 8,784,533 B2 | 7/2014 | Leta et al. ................... 95/97 |
| 8,784,534 B2 | 7/2014 | Kamakoti et al. ........... 95/97 |
| 8,784,535 B2 | 7/2014 | Ravikovitch et al. ........ 95/98 |
| 8,795,411 B2 | 8/2014 | Hufton et al. ............... 95/90 |
| 8,808,425 B2 | 8/2014 | Genkin et al. ............... 95/96 |
| 8,808,426 B2 | 8/2014 | Sundaram ................... 95/96 |
| 8,814,985 B2 | 8/2014 | Gerds et al. ................. 95/90 |
| 8,852,322 B2 | 10/2014 | Gupta et al. ............... 95/136 |
| 8,858,683 B2 | 10/2014 | Deckman ..................... 95/96 |
| 8,875,483 B2 | 11/2014 | Wettstein .................. 60/39.52 |
| 8,906,138 B2 | 12/2014 | Rasmussen et al. .......... 95/96 |
| 8,921,637 B2 | 12/2014 | Sundaram et al. ......... 585/823 |
| 8,939,014 B2 | 1/2015 | Kamakoti et al. ........... 73/38 |

(56) References Cited

U.S. PATENT DOCUMENTS

| | | | |
|---|---|---|---|
| 8,940,263 B2* | 1/2015 | Golden | B01D 53/864 |
| | | | 423/247 |
| 9,005,561 B2 | 4/2015 | Leta et al. | |
| 9,017,457 B2 | 4/2015 | Tammera | 95/96 |
| 9,028,595 B2 | 5/2015 | Sundaram et al. | |
| 9,034,078 B2 | 5/2015 | Wanni et al. | 95/8 |
| 9,034,079 B2 | 5/2015 | Deckman et al. | 95/96 |
| 9,050,553 B2 | 6/2015 | Alizadeh-Khiavi et al. | |
| 9,067,168 B2 | 6/2015 | Frederick et al. | 96/108 |
| 9,095,809 B2 | 8/2015 | Deckman et al. | 95/45 |
| 9,108,145 B2 | 8/2015 | Kalbassi et al. | 95/8 |
| 9,120,049 B2 | 9/2015 | Sundaram et al. | 96/121 |
| 9,126,138 B2 | 9/2015 | Deckman et al. | 95/95 |
| 9,162,175 B2 | 10/2015 | Sundaram | 96/121 |
| 9,168,485 B2 | 10/2015 | Deckman et al. | 95/96 |
| 2001/0047824 A1 | 12/2001 | Hill et al. | 137/312 |
| 2002/0053547 A1 | 5/2002 | Schlegel et al. | |
| 2002/0124885 A1 | 9/2002 | Hill et al. | 137/312 |
| 2002/0162452 A1 | 11/2002 | Butwell et al. | 95/96 |
| 2003/0075485 A1 | 4/2003 | Ghijsen | 208/308 |
| 2003/0129101 A1 | 7/2003 | Zettel | 422/179 |
| 2003/0131728 A1 | 7/2003 | Kanazirev et al. | 95/96 |
| 2003/0170527 A1 | 9/2003 | Finn et al. | 429/34 |
| 2003/0202918 A1 | 10/2003 | Ashida et al. | 422/180 |
| 2003/0205130 A1 | 11/2003 | Neu et al. | 95/90 |
| 2003/0223856 A1 | 12/2003 | Yuri et al. | 415/1 |
| 2004/0099142 A1 | 5/2004 | Arquin et al. | 96/134 |
| 2004/0118277 A1 | 6/2004 | Kim | |
| 2004/0197596 A1 | 10/2004 | Connor et al. | 428/630 |
| 2004/0232622 A1 | 11/2004 | Gozdawa | 277/401 |
| 2005/0109419 A1 | 5/2005 | Ohmi et al. | 141/4 |
| 2005/0114032 A1 | 5/2005 | Wang | 702/14 |
| 2005/0129952 A1 | 6/2005 | Sawada et al. | 428/409 |
| 2005/0145111 A1 | 7/2005 | Keefer et al. | 96/124 |
| 2005/0150378 A1 | 7/2005 | Dunne et al. | 95/113 |
| 2005/0229782 A1 | 10/2005 | Monereau et al. | 95/96 |
| 2005/0252378 A1 | 11/2005 | Celik et al. | 96/121 |
| 2006/0048648 A1 | 3/2006 | Gibbs et al. | 96/108 |
| 2006/0049102 A1 | 3/2006 | Miller et al. | 210/500.27 |
| 2006/0076270 A1 | 4/2006 | Poshusta et al. | 208/208 |
| 2006/0099096 A1 | 5/2006 | Shaffer et al. | 418/55.1 |
| 2006/0105158 A1 | 5/2006 | Fritz et al. | 428/317.9 |
| 2006/0162556 A1 | 7/2006 | Ackley et al. | 95/96 |
| 2006/0165574 A1 | 7/2006 | Sayari | 423/210 |
| 2006/0169142 A1 | 8/2006 | Rode et al. | 96/129 |
| 2006/0236862 A1 | 10/2006 | Golden et al. | 95/96 |
| 2007/0084241 A1 | 4/2007 | Kretchmer et al. | 63/29.2 |
| 2007/0084344 A1 | 4/2007 | Moriya et al. | 95/210 |
| 2007/0222160 A1 | 9/2007 | Roberts-Haritonov et al. | |
| | | | 277/387 |
| 2007/0253872 A1 | 11/2007 | Keefer et al. | 422/143 |
| 2007/0261550 A1 | 11/2007 | Ota | |
| 2007/0261557 A1 | 11/2007 | Gadkaree et al. | 96/121 |
| 2007/0283807 A1 | 12/2007 | Whitley | 95/96 |
| 2008/0051279 A1 | 2/2008 | Klett et al. | 502/60 |
| 2008/0072822 A1 | 3/2008 | White | 118/722 |
| 2008/0128655 A1 | 6/2008 | Garg et al. | 252/373 |
| 2008/0282883 A1 | 11/2008 | Rarig et al. | 95/96 |
| 2008/0282884 A1 | 11/2008 | Kelley et al. | 95/96 |
| 2008/0282885 A1 | 11/2008 | Deckman et al. | 95/96 |
| 2008/0282886 A1 | 11/2008 | Reyes et al. | 95/98 |
| 2008/0282887 A1 | 11/2008 | Chance | 95/98 |
| 2008/0282892 A1 | 11/2008 | Deckman et al. | 96/140 |
| 2008/0289497 A1 | 11/2008 | Barclay et al. | 95/114 |
| 2008/0307966 A1 | 12/2008 | Stinson | 95/187 |
| 2008/0314550 A1 | 12/2008 | Greco | 165/4 |
| 2009/0004073 A1 | 1/2009 | Gleize et al. | 422/180 |
| 2009/0014902 A1 | 1/2009 | Koivunen et al. | 265/11 |
| 2009/0025553 A1 | 1/2009 | Keefer et al. | 95/96 |
| 2009/0025555 A1 | 1/2009 | Lively et al. | |
| 2009/0037550 A1 | 2/2009 | Mishra et al. | 708/208 |
| 2009/0071333 A1 | 3/2009 | LaBuda et al. | 95/96 |
| 2009/0079870 A1 | 3/2009 | Matsui | 348/558 |
| 2009/0107332 A1 | 4/2009 | Wagner | 95/100 |
| 2009/0151559 A1 | 6/2009 | Verma et al. | 95/96 |
| 2009/0162268 A1 | 6/2009 | Hufton et al. | 423/210 |
| 2009/0180423 A1 | 7/2009 | Kroener | 370/328 |
| 2009/0241771 A1 | 10/2009 | Manning et al. | 95/15 |
| 2009/0284013 A1 | 11/2009 | Anand et al. | 290/52 |
| 2009/0294366 A1 | 12/2009 | Wright et al. | |
| 2009/0308248 A1 | 12/2009 | Siskin et al. | 95/236 |
| 2009/0314159 A1 | 12/2009 | Haggerty | 95/90 |
| 2010/0059701 A1 | 3/2010 | McLean | 251/304 |
| 2010/0077920 A1 | 4/2010 | Baksh et al. | 95/97 |
| 2010/0089241 A1 | 4/2010 | Stoner et al. | 96/125 |
| 2010/0186445 A1 | 7/2010 | Minta et al. | 62/606 |
| 2010/0212493 A1 | 8/2010 | Rasmussen et al. | 95/45 |
| 2010/0251887 A1 | 10/2010 | Jain | 95/46 |
| 2010/0252497 A1 | 10/2010 | Ellison et al. | 210/500.1 |
| 2010/0263534 A1 | 10/2010 | Chuang | 95/139 |
| 2010/0282593 A1 | 11/2010 | Speirs et al. | 203/11 |
| 2010/0288704 A1 | 11/2010 | Amsden et al. | 210/688 |
| 2011/0011803 A1 | 1/2011 | Koros | |
| 2011/0031103 A1 | 2/2011 | Deckman et al. | 203/41 |
| 2011/0067440 A1 | 3/2011 | Van Aken | 62/613 |
| 2011/0067770 A1 | 3/2011 | Pederson et al. | 137/625.15 |
| 2011/0146494 A1 | 6/2011 | Desai et al. | 96/115 |
| 2011/0217218 A1 | 9/2011 | Gupta et al. | 423/228 |
| 2011/0277620 A1 | 11/2011 | Havran et al. | 89/1.14 |
| 2011/0291051 A1 | 12/2011 | Hershkowitz et al. | 252/373 |
| 2011/0296871 A1 | 12/2011 | Van Soest-Vercammen et al. | |
| | | | 62/636 |
| 2011/0308524 A1 | 12/2011 | Brey et al. | 128/205.12 |
| 2012/0024152 A1 | 2/2012 | Yamawaki et al. | 95/96 |
| 2012/0031144 A1 | 2/2012 | Northrop et al. | 62/617 |
| 2012/0067216 A1 | 3/2012 | Corma Canos et al. | 95/95 |
| 2012/0152115 A1 | 6/2012 | Gerds et al. | 95/90 |
| 2012/0222551 A1 | 9/2012 | Deckman | 95/96 |
| 2012/0222552 A1 | 9/2012 | Ravikovitch et al. | 95/97 |
| 2012/0222553 A1 | 9/2012 | Kamakoti et al. | 95/99 |
| 2012/0222554 A1 | 9/2012 | Leta et al. | 95/104 |
| 2012/0222555 A1 | 9/2012 | Gupta et al. | 95/136 |
| 2012/0255377 A1 | 10/2012 | Kamakoti et al. | 73/863.23 |
| 2012/0308456 A1 | 12/2012 | Leta et al. | 423/228 |
| 2012/0312163 A1 | 12/2012 | Leta et al. | 95/97 |
| 2013/0061755 A1 | 3/2013 | Frederick et al. | 96/110 |
| 2013/0225898 A1 | 8/2013 | Sundaram et al. | 585/802 |
| 2014/0013955 A1 | 1/2014 | Tammera et al. | 96/115 |
| 2014/0060326 A1 | 3/2014 | Sundaram et al. | 95/96 |
| 2014/0157986 A1 | 6/2014 | Ravikovitch et al. | 95/96 |
| 2014/0208797 A1 | 7/2014 | Kelley et al. | 62/611 |
| 2014/0216254 A1 | 8/2014 | Tammera et al. | 95/114 |
| 2014/0338425 A1* | 11/2014 | Kalbassi | B01D 53/047 |
| | | | 73/31.07 |
| 2015/0013377 A1 | 1/2015 | Oelfke | |
| 2015/0068397 A1 | 3/2015 | Boulet et al. | |
| 2015/0196870 A1 | 7/2015 | Albright et al. | |

FOREIGN PATENT DOCUMENTS

| | | |
|---|---|---|
| EP | 0257493 | 2/1988 |
| EP | 0426937 | 5/1991 |
| EP | 1018359 | 7/2000 |
| EP | 1577561 | 9/2005 |
| EP | 1674555 | 6/2006 |
| EP | 2823872 | 1/2015 |
| FR | 2924951 | 6/2009 |
| JP | 58-114715 | 7/1983 |
| JP | 59-232174 | 12/1984 |
| JP | 60-189318 | 12/1985 |
| JP | 2002-253818 | 10/1990 |
| JP | 04-180978 | 6/1992 |
| JP | 2011-169640 | 6/1999 |
| JP | 2011-280921 | 10/1999 |
| JP | 2000-024445 | 8/2001 |
| JP | 2002-348651 | 12/2002 |
| JP | 2006-016470 | 1/2006 |
| JP | 2006-036849 | 2/2006 |
| JP | 2008-272534 | 11/2008 |
| WO | WO2002/024309 | 3/2002 |
| WO | WO2002/073728 | 9/2002 |

(56) References Cited

FOREIGN PATENT DOCUMENTS

| WO | WO20051090793 | 9/2005 |
| WO | WO2011/139894 | 11/2011 |

OTHER PUBLICATIONS

ExxonMobil Research and Engineering and Xebec (2008) RCPSA—Rapid Cycle Pressure Swing Adsorption—An Advanced, Low-Cost Commercialized H2 Recovery Process, *Brochure*, 2 pages.

ExxonMobil Research and Engineering and QuestAir (2008) "A New Commercialized Process for Lower Cost H2 Recovery—Rapid Cycle Pressure Swing Adsorption (RCPSA)," *Brochure*, 4 pgs.

Farooq, S. et al. (1990) "Continuous Contercurrent Flow Model for a Bulk PSA Separation Process," *AIChE J.*, v36 (2) p. 310-314.

FlowServe (2005) "Exceeding Expectations, US Navy Cuts Maintenance Costs With Flowserve GX-200 Non-Contacting Seal Retrofits," *Face-to-Face*, v17.1, 8 pgs.

GE Oil & Gas (2007) "Dry Gas Seal Retrofit," Florene, Italy, www.ge com/oilandgas, 4 pgs.

Hopper, B. et al. (2008) "World's First 10,000 psi Sour Gas Injection Compressor," *Proceedings of the 37th Turbomachinery Symosium*, pp. 73-95.

Kikkinides, E. S. et al. (1995) "Natural Gas Desulfurization by Adsorption: Feasibility and Multiplicity of Cyclic Steady States," *Ind. Eng. Chem. Res.* V. 34, pp. 255-262.

Rameshni, Mahin (May 19, 2007) "Strategies for Sour Gas Field Developments," *Worley Parsons—Brochure*, 20 pgs.

Reyes, S. C. et al.(1997) "Frequency Modulation Methods for Diffusion and Adsorption Measurements in Porous Solids," *J. Phys. Chem. B.* v101, pp. 614-622.

Ruthven, D. M. et al. (1996) "Performance of a Parallel Passage Adsorbent Contactor," *Gas. Sep. Purif.*, vol. 10, No. 1, pp. 63-73.

Stahley, J. S. (2003) "Design, Operation, and Maintenance Considerations for Improved Dry Gas Seal Realiability in Centrifugal Compressors," *Dresser-Rand, Tech. Paper 134*, 15 pages.

Suzuki, M. (1985) "Continuous-Countercurrent-Flow Approximation for Dynamic Steady State Profile of Pressure Swing Adsorption" *AIChE Symp. Ser.* v81 (242) pp. 67-73.

\* cited by examiner

APPARATUS AND SYSTEM FOR SWING ADSORPTION PROCESSES RELATED THERETO

CROSS REFERENCE TO RELATED APPLICATIONS

This application claims the benefit of U.S. Provisional Application No. 62/213,262 filed Sep. 2, 2015, entitled "Apparatus and System for Swing Adsorption Processes Related Thereto", the entirety of which is incorporated herein by reference.

Additionally, it is noted that this application is related to U.S. Provisional Application No. 62/213,267 filed Sep. 2, 2015, entitled "Apparatus and System for Swing Adsorption Processes Related Thereto;" U.S. Provisional Application No. 62/213,270 filed Sep. 2, 2015, entitled "Apparatus and System for Combined Temperature and Pressure Swing Adsorption Processes Related Thereto" and U.S. Provisional Application No. 62/213,273 filed Sep. 2, 2015, entitled "Apparatus and System for Swing Adsorption Processes Related Thereto."

FIELD

The present techniques relate to a system associated with an enhanced swing adsorption process. In particular, the system relates to a swing adsorption process for the removing contaminants from a feed stream, such as dehydration of natural gas, utilizing rapidly cycled adsorbent beds. This system may be used for dehydrating a feed stream to satisfy liquefied natural gas (LNG) specifications for LNG plants and/or specifications for other plants.

BACKGROUND

Gas separation is useful in many industries and can typically be accomplished by flowing a mixture of gases over an adsorbent material that preferentially adsorbs one or more gas components, while not adsorbing one or more other gas components. The non-adsorbed components are recovered as a separate product.

One particular type of gas separation technology is swing adsorption, such as temperature swing adsorption (TSA), pressure swing adsorption (PSA), partial pressure swing adsorption (PPSA), rapid cycle pressure swing adsorption (RCPSA), rapid cycle partial pressure swing adsorption (RCPPSA), and not limited to, but also combinations of the fore mentioned processes, such as pressure and temperature swing adsorption. As an example, PSA processes rely on the phenomenon of gases being more readily adsorbed within the pore structure or free volume of an adsorbent material when the gas is under pressure. That is, the higher the gas pressure, the greater the amount of readily-adsorbed gas adsorbed. When the pressure is reduced, the adsorbed component is released, or desorbed from the adsorbent material.

The swing adsorption processes (e.g., PSA and/or TSA) may be used to separate gases of a gas mixture because different gases tend to fill the micropore of the adsorbent material to different extents. For example, if a gas mixture, such as natural gas, is passed under pressure through a vessel containing an adsorbent material that is more selective towards carbon dioxide than it is for methane, at least a portion of the carbon dioxide is selectively adsorbed by the adsorbent material, and the gas exiting the vessel is enriched in methane. When the adsorbent material reaches the end of its capacity to adsorb carbon dioxide, it is regenerated by reducing the pressure, thereby releasing the adsorbed carbon dioxide. The adsorbent material is then typically purged and repressurized. Then, the adsorbent material is ready for another adsorption cycle.

The swing adsorption processes typically involve adsorbent bed units, which include adsorbent beds disposed within a housing configured with maintain fluids at various pressures for different steps in an adsorption cycle within the unit. These adsorbent bed units utilize different packing material in the bed structures. For example, the adsorbent bed units utilize checker brick, pebble beds or other available packing. As an enhancement, some adsorbent bed units may utilize engineered packing within the bed structure. The engineered packing may include a material provided in a specific configuration, such as a honeycomb, ceramic forms or the like.

Further, various adsorbent bed units may be coupled together with conduits and valves to manage the flow of fluids. Orchestrating these adsorbent bed units involves coordinating the cycles for each of the adsorbent bed units with other adsorbent bed units in the system. A complete cycle can vary from seconds to minutes as it transfers a plurality of gaseous streams through one or more of the adsorbent bed units.

Unfortunately, conventional processes for dehydration of natural gas streams are typically performed using large molecular sieve adsorbent beds, wherein the thermal swing cycle is hours long. This conventional process requires large and expensive high pressure adsorbent beds, a large inventory of adsorbent material, and involves large footprints and weights, capital investment and fuel usage for gas furnaces. Indeed, in these processes, the adsorption front progresses through the majority of the adsorbent bed's length, and desorption is accomplished using dry gas heated to over 500° F. (Fahrenheit) (260° C. (Celsius), which is heated with a fired furnace. The conventional TSA molecular sieve process uses high temperature purge gas (e.g., at or even above 500° F. (260° C.)) to completely dehydrate the adsorbent beds during each cycle. High temperature purge gas is used in conventional TSA molecular sieve process to minimize the volume of regeneration gas required. This process is driven by economic and expenditure considerations, because handling the regeneration gas volumes (e.g., via recycle compression or some other method) is more costly than simply heating the regeneration gas to a higher temperature. Thus, the regeneration gas temperature is limited to around 500° F. (260° C.) to avoid molecular sieve degradation. Yet, even limiting the regeneration gas to 500° F. (260° C.), the high temperature purge gas results in problems, such as hydrothermal degradation of the adsorbent particles and coke formation within the adsorbent bed leading to deactivation and associated downtime. Additionally, the use of a fired furnace in a natural gas plant is a safety concern that involves additional safety measures to manage.

In addition, for floating operations, the size and weight of conventional TSA molecular sieve process are problematic for stability and buoyance considerations. In particular, the excessive weight and footprint for conventional systems add to the complexity of the floating facility and increase the size of the facilities. Additionally, the floating facilities may be remotely located and may be difficult to access and resupply the equipment and fuel. Also, the additional size and complexity increase the capital investment costs along with the operating costs for the floating facilities. In addition, as noted above, the use of a fired furnace is further complicated by the limited space available.

Accordingly, there remains a need in the industry for apparatus, methods, and systems that provided an enhancements to the processing of streams to remove contaminants, such as processing the natural gas streams prior to liquefaction into an LNG feed stream. The present techniques provide a reduction in cost, size, and weight of facilities for natural gas dehydration prior to liquefaction. Further, a need remains for a dehydration process that does not use purge gases heated to over 500° F. (260° C.) and does not use fire heaters.

SUMMARY OF THE INVENTION

In one or more embodiments, the present techniques include a process for removing contaminants from a gaseous feed stream. The process comprising: a) performing one or more adsorption steps; wherein each of the one or more adsorption steps comprises passing a gaseous feed stream at a feed pressure and a feed temperature through an adsorbent bed unit to separate one or more contaminants from the gaseous feed stream to form a product stream; b) performing one or more depressurization steps, wherein the pressure of the adsorbent bed unit is reduced by a predetermined amount with each successive depressurization step; c) performing one or more purge steps, wherein each of the one or more purge steps comprise passing a purge stream into the adsorbent bed unit, wherein the purge stream flows countercurrent to the direction of the feed stream, the purge stream is provided at a temperature at least 50° F. (27.8° C.) above the feed temperature (or at least 100° F. (55.6° C.) above the feed temperature) and less than 450° F. (232.2° C.) and the purge stream flow rate is equal to or less than 20 molar percent (%) of the feed stream flow rate (e.g., the purge stream may contain equal to or less than 20 molar % of the hydrocarbons, such as methane, in the feed stream or preferably equal to or less than 10 molar % of the hydrocarbons, such as methane, in the feed stream); d) performing one or more re-pressurization steps, wherein the pressure within the adsorbent bed unit is increased with each re-pressurization step by a predetermined amount with each successive re-pressurization step; and e) repeating the steps a) to d) for at least one additional cycle, wherein the cycle duration is for a period greater than 1 second and less than 600 seconds, preferably period greater than 2 second and less than 300 seconds or preferably period greater than 1 second and less than 90 seconds. The purge stream may be provided in a range between 200° F. (93.3° C.) and 450° F. (232.2° C.) or in a range between 250° F. (121.1° C.) and 380° F. (193.3° C.).

In another embodiment, a system for removing contaminants from a gaseous feed stream is described. The system comprises: an adsorbent bed unit, a liquefied natural gas process unit and one or more purge unit. The adsorbent bed unit is configured to separate contaminants from a gaseous feed stream and to output a product stream, wherein the gaseous feed stream is provided at a feed temperature. The liquefied natural gas process unit is configured to receive the product stream and separate the product stream into a final product stream and a flash fuel stream. One or more purge units is configured to provide a purge stream to the adsorbent bed unit, wherein the purge stream is provided from one of a portion of the product stream, the flash fuel stream, a boil off gas stream and any combination thereof; and wherein the purge stream is provided at a temperature at least 50° F. (27.8° C.) above the feed temperature and less than 450° F. (232.2° C.) and the purge stream contains equal to or less than 20 molar % of the hydrocarbons in the gaseous feed stream. The purge stream may be passed through the adsorbent bed unit at a temperature at least 100° F. (55.6° C.) above the feed temperature) and the purge stream may contain equal to or less than 20 molar % of the methane in the feed stream or preferably equal to or less than 10 molar % of the methane in the feed stream. The one or more purge units may comprise one or more compressors configured to compress one of the flash fuel stream, a boil off gas stream and any combination thereof.

BRIEF DESCRIPTION OF THE FIGURES

The foregoing and other advantages of the present disclosure may become apparent upon reviewing the following detailed description and drawings of non-limiting examples of embodiments.

DETAILED DESCRIPTION OF THE INVENTION

Figure 1:
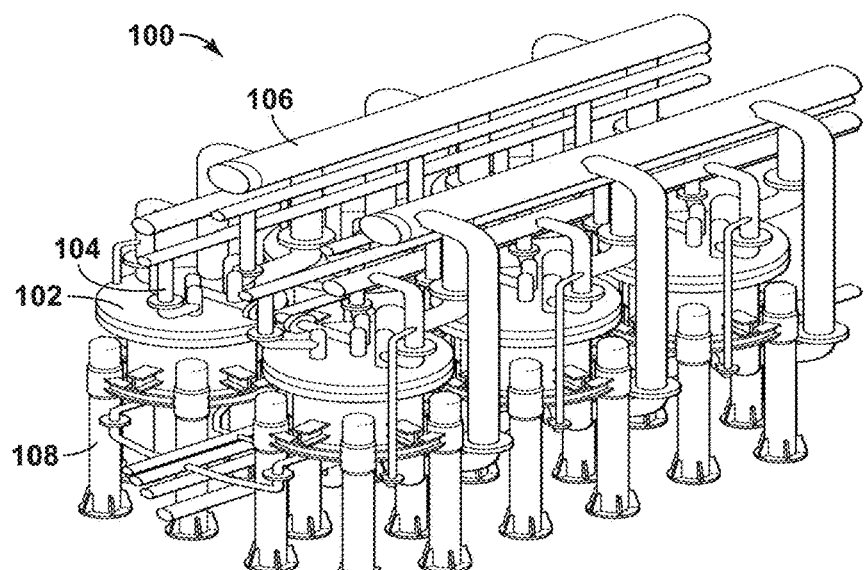
FIG. 1 is a three-dimensional diagram of the swing adsorption system with six adsorbent bed units and interconnecting piping in accordance with an embodiment of the present techniques.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

As used herein, "stream" refers to fluid (e.g., solids, liquid and/or gas) being conducted through various equipment. The equipment may include conduits, vessels, manifolds, units or other suitable devices.

As used herein, volume percent is based on standard conditions. The standard conditions are normalized to the temperature of 0° C. (e.g., 32° F.) and absolute pressure of 100 kiloPascals (kPa) (1 bar).

As used herein, "conduit" refers to a tubular member forming a channel through which something is conveyed. The conduit may include one or more of a pipe, a manifold, a tube or the like.

The present techniques relate to a swing adsorption process (e.g., a rapid cycle process) for the dehydration of a feed stream (e.g., natural gas) utilizing rapidly cycled adsorbent beds. The process may involve adsorbent beds that are partially depressurized and heated by a counter-current gas flow of moderately hot dry product gas to thermally assisted partial pressure purge desorption (e.g., a purge stream). In contrast to conventional approaches, the present techniques utilize lower temperature purge streams, which may not completely dehydrate the adsorbent bed. As a result, the temperature in the purge stream may be generated by other means than gas furnaces, such as solely by compression. The lower temperatures in the purge stream may be utilized to provide cost and safety benefits, along with operational enhancements. For example, the lower temperate may lessen hydrothermal degradation of the adsorbent and lessen coke formation. Further, the present techniques may be less expensive compared to conventional TSA molecular sieve systems and have a smaller footprint by using adsorbent beds rather than conventional TSA molecular sieve dehydration.

As one enhancement, the present techniques use a purge stream having lower temperatures (e.g., less than 450° F. (232.2° C.)) than conventional approaches. The purge stream may be less than 450° F. (232.2° C.) and preferably less than 360° F. (182.2° C.). For example, the temperature in the purge stream may range between a temperature approximately 50° F. (27.8° C.) above the feed temperature and 450° F. (232.2° C.), may range between a temperature approximately 100° F. (55.6° C.) above the feed temperature and 450° F. (232.2° C.), may range between 200° F. (93.3° C.) and 450° F. (232.2° C.), may range between 250° F. (121.1° C.) and 380° F. (193.3° C.), and/or may range between 280° F. (137.8° C.) and 360° F. (182.2° C.). The purge stream may also be a dry purge gas, which is used to heat the adsorbent bed during desorption. The lower temperature may lessen the hydrothermal degradation of the adsorbent materials and may lessen the formation of coke. Further, the lower temperature purge stream may be generated from the use of compression, which may be only source of the heat for this purge gas. In some embodiments, the lower temperature purge gas may be heated solely by compression, thus eliminating a fired heater and thus reducing capital investment and enhancing safety.

Also, the present techniques may also include various pressures for the feed stream and the purge stream. For example, the feed pressure of the feed stream may be based on the preferred adsorption feed pressure, which may be in the range from 400 pounds per square inch absolute (psia) to 1,400 psia, in the range from 600 psia to 1,200 psia. Also, the purge pressure of the purge stream may be based on the preferred adsorbent purge pressure, which may be in the range from 200 pounds per square inch absolute (psia) to 800 psia, in the range from 400 psia to 600 psia.

Further, another enhancement is that the purge stream contains a portion of the feed stream. By way of example, the purge stream flow rate may be equal to or less than 20 molar percent (%) of the feed stream flow rate; the purge stream flow rate may be equal to or less than 15 molar % of the feed stream flow rate; or the purge stream flow rate may be equal to or less than 10 molar % of the feed stream flow rate. Further, the purge stream flow rate may be greater than or equal to 1 molar % of the feed stream flow rate; the purge stream flow rate may greater than or equal to 3 molar % of the feed stream flow rate; or the purge stream flow rate may be greater than or equal to 5 molar % of the feed stream flow rate. As another example, the purge stream may contain equal to or less than 20 molar % of the hydrocarbons, such as methane, in the feed stream; or preferably equal to or less than 10 molar % of the hydrocarbons, such as methane, in the feed stream. Further, the purge stream may contain equal to or greater than 1 molar % of the hydrocarbons, such as methane, in the feed stream; preferably equal to or greater than 3 molar % of the hydrocarbons, such as methane, in the feed stream, or preferably equal to or greater than 5 molar % of the hydrocarbons, such as methane, in the feed stream. As a specific example, the purge stream, which includes a portion of the methane from the feed stream, may include equal to or less than 20 molar % of the methane in the feed stream, equal to or less than 15 molar % of the methane in the feed stream, equal to or less than 10 molar % of the methane in the feed stream, or equal to or less than 7 molar % of the methane in the feed stream.

Further, the purge stream may include a portion of the feed stream. By way of example, the portion of the methane in the purge stream may be equal to or greater than 1 molar % of the methane in the feed stream; or preferably equal to or greater than 3 molar % of the methane in the feed stream; or preferably equal to or greater than 5 molar % of the methane in the feed stream. Also, the portion of the hydrocarbons in the purge stream may be equal to or greater than 1 molar % of the hydrocarbons in the feed stream; or preferably equal to or greater than 3 molar % of the hydrocarbons in the feed stream; or preferably equal to or greater than 5 molar % of the hydrocarbons in the feed stream. As yet another example, the purge stream flow rate may be equal to or greater than 1 molar percent (%) of the feed stream flow rate; the purge stream flow rate may be equal to or greater than 3 molar % of the feed stream flow rate; or the purge stream flow rate may be equal to or greater than 5 molar % of the feed stream flow rate.

As another enhancement, the present techniques may provide dehydration through the use of a rapid cycle swing adsorption process, such as a TSA process. While the swing capacity per mass of the adsorbent bed may be less than conventional TSA molecular sieve dehydration, without the requirement for complete drying of the adsorbent bed (e.g., directionally making the quantity of adsorbent per feed volume required larger), the use of rapid cycles may lessen the adsorbent quantity as compared to conventional TSA molecular sieve dehydration in that the required adsorbent quantity is ten to more than one hundred times smaller than conventional TSA molecular sieve dehydration, which depends on the specific configuration. Also, lower temperatures of adsorbent bed heating may be utilized without the required complete drying of the adsorbent bed. Accordingly, the lower temperature of the purge stream in the purge step of the present techniques may be heated by compression only, lessening or eliminating costly heat exchangers or fired heaters. Additionally, the present techniques may combine thermal swing adsorption with a pressure swing adsorption to further enhance the process.

In the present techniques, the product end of the adsorbent bed is maintained nearly dry (e.g., the water loading for the region near the product end is less than 1 mole per kilogram (mol/kg), is less than 0.5 mol/kg, or is less than 0.1 mol/kg), but it may not need to be fully dry the feed end of the adsorbent bed. The feed end or feed side is the end of the adsorbent bed that the feed stream initially enters, while the product end is the portion of the adsorbent bed opposite from the feed end and where the feed stream exits the adsorbent bed. The loading level of water may be lower on the feed side of the adsorbent bed during the purge step, but the length of adsorbent bed that contains water is reduced during the purge step. For example, an adsorbate loaded region may be a specific portion of the adsorbent bed from the feed end of the adsorbent bed to 10% of the bed length, from the feed end of the adsorbent bed to 40% of the bed length or from the feed end of the adsorbent bed to 75% of the bed length. The product region may be a specific portion of the adsorbent bed from the product end of the adsorbent bed to 10% of the bed length, from the product end of the adsorbent bed to 25% of the bed length or from the product end of the adsorbent bed to 40% of the bed length. Utilizing only a portion of the bed length ensures that the product end of the adsorbent bed remains rigorously dry and provides extremely low product water concentrations. Further, maintaining a significant portion of the product end of the adsorbent bed dry provides flexibility for non-uniformity of gas passage channels in embodiments where a structured adsorbent, such as a monolith, is used for the adsorber structure or adsorbent bed. The movement of the wet front back during purge step and forward during the adsorption step is the basis of the swing capacity of the process. In part, this is achieved by using a limited, cost effective quantity of purge gas in the purge steam in this process and configuration.

In addition, the present techniques may be integrated into various configurations to provide additional functionality. For example, the present techniques may be utilized, but not limited, for dehydration of a stream prior to and integrated with a liquefied natural gas (LNG) plant, which may involve removing contaminants to LNG specifications. Other integrations may include cryogenic natural gas liquefaction recovery plant, control freeze zone plants or other such plants. Regardless, the present techniques may be used to treat gases containing higher or lower amounts of water and for $CO_2$ levels as high as about 500 parts per million molar (ppm) to LNG specifications. The present techniques may also be used to remove contaminants to other specifications, such as cryogenic natural gas liquefaction specifications for a cryogenic natural gas liquefaction recovery plant or the like. The process of partially heating the adsorbent bed utilizing a thermal wave during a purge step coupled with rapid cycles provides enhancements, such as economical enhancements, to other thermal swing adsorption separations known to those skilled in the art.

Beneficially, the present techniques provide various advantages. For example, the present techniques provide a modular design and may be configured to lessen the footprint, weight, and capital expense of processes to treat dehydration of feed streams (e.g., natural gas) utilizing rapidly cycled adsorbent beds. The present techniques may be used for liquefied natural gas (LNG) plants and the other suitable plants. Also, as this process does not involve the use any fired furnaces, the present techniques may eliminate the use of fired furnaces or high temperature heat exchanger from the process. The removal of such equipment is inherently safer due to the elimination of the flames along with the associated equipment and may lower fuel consumption and greenhouse gas (GHG) emissions due to lack of combustion in a furnace. Further, the present techniques may increase flexibility regarding the selection of adsorbent material used in the process, may reduce dust formation due to monolithic adsorbent bed design, may lessen solid waste production due to lower adsorbent quantities and/or may lessen adsorption of heavy hydrocarbons (e.g., $C_{2+}$) due to low adsorbent quantities. The present techniques may also lower impact on downstream process equipment when switching adsorbent beds due to the modular configuration of the rapid cycle TSA equipment providing some of the adsorbent beds to be replaced or regenerated off-line, while the remainder of the adsorbent bed units continue to provide dry product to the downstream equipment (e.g., LNG or cryogenic separation plant).

In one or more embodiments, the swing adsorption system may include one or more purge units in fluid communication with a liquefied natural gas process unit. The purge units may be configured to provide a purge stream to each of the adsorbent bed units, wherein the purge stream is provided from one of a portion of the product stream, the flash fuel stream, a boil off gas stream and any combination thereof. By way of example, the purge units may be or include one or more compressors configured to compress one of the flash fuel stream, a boil off gas stream and any combination thereof. Also, the purge units may be or include one or more pressure reduction devices (e.g., expanders or valve) configured to decompress the portion of the product stream. The portion of the product stream may be from any one of the adsorbent bed units within the swing adsorption system.

Also, in one or more embodiments, the present techniques can be used for any type of swing adsorption process. Non-limiting swing adsorption processes for which the present techniques may include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes, such as pressure/temperature swing adsorption. Exemplary kinetic swing adsorption processes are described in U.S. Patent Application Publication Nos. 2008/0282892, 2008/0282887, 2008/0282886, 2008/0282885, 2008/0282884 and 2014/0013955, which are each herein incorporated by reference in their entirety.

Adsorptive separation processes, apparatus, and systems, as described above, are useful for development and production of hydrocarbons, such as gas and oil processing. Particularly, the provided processes, apparatus, and systems are useful for the rapid, large scale, efficient separation of a variety of target gases from gas mixtures. In particular, the processes, apparatus, and systems may be used to prepare feed products (e.g., natural gas products) by removing contaminants (e.g., $CO_2$, $H_2O$ and heavy hydrocarbons (i.e. hydrocarbons having at least two carbon atoms)). The provided processes, apparatus, and systems are useful for preparing gaseous feed streams for use in utilities, including separation applications. The separation applications may include dew point control; sweetening and/or detoxification; corrosion protection and/or control; dehydration; heating value; conditioning; and/or purification. Examples of utilities that utilize one or more separation applications include generation of fuel gas; seal gas; non-potable water; blanket gas; instrument and control gas; refrigerant; inert gas; and/or hydrocarbon recovery.

In certain embodiments, the present techniques may be used to remove contaminants feed streams, such as acid gas from hydrocarbon streams. Acid gas removal technology may be useful for gas reserves exhibit higher concentrations of acid gas (e.g., sour gas resources). Hydrocarbon feed streams vary widely in amount of acid gas, such as from several parts per million acid gas to 90 volume percent (vol.

%) acid gas. Non-limiting examples of acid gas concentrations from exemplary gas reserves include concentrations of at least: (a) 1 vol. % $H_2S$, 5 vol. % $CO_2$, (b) 1 vol. % $H_2S$, 15 vol. % $CO_2$, (c) 1 vol. % $H_2S$, 60 vol. % $CO_2$, (d) 15 vol. % $H_2S$, 15 vol. % $CO_2$, and (e) 15 vol. % $H_2S$, 30 vol. % $CO_2$. Accordingly, the present techniques may include equipment to remove various contaminants, such as $H_2S$ and $CO_2$ to desired levels. In particular, the $H_2S$ may be lowered to levels less than 4 ppm, while the $CO_2$ may be lowered to levels less than 100 ppm or less than 50 ppm.

In other embodiments, the present techniques may be used to lessen the water content of the stream to a specific level by the swing adsorption process. For example, the water content of a feed stream may range from a few ppm to saturation levels in the stream. In particular, the water content may range from a few hundred ppm to saturation levels, such as 100 ppm to 1,500 ppm dependent on the feed pressure or 500 ppm to 1,500 ppm dependent on the feed pressure. The specific water level of the product stream from the swing adsorption process may be related to dew point of desired output product (e.g., the dew point from the water content should be lower than the lowest temperature of the stream in a subsequent process, such as liquefaction and is related to the feed pressure and feed composition). For LNG applications, the water content may be less than 0.1 ppm, as the dew point may be $-260°$ F. ($-162.2°$ C.). For cryogenic Natural Gas Liquid (NGL) recovery applications, the water content may be less than 1 ppm, as the dew point may be about $-150°$ F. ($-101.1°$ C.). For controlled freeze zone (CFZ) applications, the water content may be less than 10 ppm, as the dew point may be about $-60°$ F. ($51.1°$ C.). The water content of the product stream may be less than (<) 0.1 parts per million volume (ppmv); <10 ppmv, <1 ppmv or <0.1 ppmv. By way of example, the gaseous feed stream may include hydrocarbons and $H_2O$, wherein the $H_2O$ is in the range of 0.2 parts per million volume to saturation levels in the gaseous feed stream or the $H_2O$ may be in the range of 100 ppmv to 1500 ppmv.

In certain embodiments, the gaseous feed stream entering the swing adsorption process or one of the adsorbent bed units may be conditioned to address problems with the pressure drop from passing through the poppet valves. This pressure drop from the poppet valves may result in a liquid drop out within the adsorbent bed. To avoid the liquid drop out, the gaseous feed stream may be heated to lessen or eliminate the liquid dropout. By way of example, the gaseous feed stream may be passed through a heater or heat exchanger to increase the temperature of the gaseous feed stream to lessen or eliminate liquid dropout. The gaseous feed stream may have the temperature increased by at least $2°$ F. ($1.1°$ C.), at least $5°$ F. ($2.8°$ C.) or at least $20°$ F. ($11.1°$ C.).

Further, in one or more embodiments, the present techniques may include a specific process flow to remove contaminants, such as water. For example, the process may include an adsorbent step and a regeneration step, which form the cycle. The adsorbent step may include passing a gaseous feed stream at a feed pressure and a feed temperature through an adsorbent bed unit to separate one or more contaminants from the gaseous feed stream to form a product stream. The feed stream may be passed through the adsorbent bed in a forward direction (e.g., from the feed end of the adsorbent bed to the product end of the adsorbent bed). Then, the flow of the gaseous feed stream may be interrupted for a regeneration step. The regeneration step may include one or more depressurization steps, a purge step and one or more re-pressurization steps. The depressurization steps may include reducing the pressure of the adsorbent bed unit by a predetermined amount for each successive depressurization step, which may be a single step and/or multiple steps and may be one or more blowdown steps. The depressurization step may be provided in a forward direction or may preferably be provided in a countercurrent direction (e.g., from the product end of the adsorbent bed to the feed end of the adsorbent bed). The purge step may include passing a purge stream into the adsorbent bed unit, which may be a once through purge step and the purge stream may be provided in countercurrent flow relative to the feed stream.

The purge stream may be provided in the temperature ranges, flow rates and have compositions, as noted above. For example, the purge stream, which may include a portion of the methane in the feed stream, may include equal to or less than 20 molar % of the methane in the feed stream; or equal to or less than 10 molar % of the methane in the feed stream. Also, the purge stream flow rate may be equal to or less than 20 molar percent (%) of the feed stream flow rate; the purge stream flow rate is equal to or less than 15 molar % of the feed stream flow rate; or the purge stream flow rate is equal to or less than 10 molar % of the feed stream flow rate. Further, the purge stream flow rate may be greater than or equal to 1 molar % of the feed stream flow rate; the purge stream flow rate may greater than or equal to 3 molar % of the feed stream flow rate; or the purge stream flow rate is greater than or equal to 5 molar % of the feed stream flow rate. As another example, the purge stream may contain equal to or less than 20 molar % of the hydrocarbons, such as methane, in the feed stream; or preferably equal to or less than 10 molar % of the hydrocarbons, such as methane, in the feed stream. Further, the purge stream may contain equal to or greater than 1 molar % of the hydrocarbons, such as methane, in the feed stream; preferably equal to or greater than 3 molar % of the hydrocarbons, such as methane, in the feed stream, or preferably equal to or greater than 5 molar % of the hydrocarbons, such as methane, in the feed stream. As a specific example, the purge stream, which includes a portion of the methane from the feed stream, may include equal to or less than 20 molar % of the methane in the feed stream, equal to or less than 15 molar % of the methane in the feed stream, equal to or less than 10 molar % of the methane in the feed stream, or equal to or less than 7 molar % of the methane in the feed stream. The portion of the methane in the purge stream may be equal to or greater than 1 molar % of the methane in the feed stream; or preferably equal to or greater than 3 molar % of the methane in the feed stream; or preferably equal to or greater than 5 molar % of the methane in the feed stream.

The output stream from the purge step may be conducted away for fuel in other equipment, such as the LNG plant. Then, the one or more re-pressurization steps may be performed, wherein the pressure within the adsorbent bed unit is increased with each re-pressurization step by a predetermined amount with each successive re-pressurization step. Then, the cycle may be repeated for additional streams. The cycle duration may be for a period greater than 1 second and less than 600 seconds, for a period greater than 2 second and less than 300 seconds, for a period greater than 2 seconds and less than 200 seconds, for a period greater than 1 second or 2 seconds and less than 90 seconds, or for a period greater than 2 seconds and less than 60 seconds. The present techniques may be further understood with reference to the FIGS. 1 to 6C below.

FIG. 1 is a three-dimensional diagram of the swing adsorption system 100 having six adsorbent bed units and interconnecting piping. While this configuration is a specific example, the present techniques broadly relate to adsorbent bed units that can be deployed in a symmetrical orientation, non-symmetrical orientation and/or combination of a plurality of hardware skids. Further, this specific configuration is for exemplary purposes as other configurations may include different numbers of adsorbent bed units.

In this system, the adsorbent bed units, such as adsorbent bed unit 102, may be configured for a cyclical swing adsorption process for removing contaminants from feed streams (e.g., fluids, gaseous or liquids). For example, the adsorbent bed unit 102 may include various conduits (e.g., conduit 104) for managing the flow of fluids through, to or from the adsorbent bed within the adsorbent bed unit 102. These conduits from the adsorbent bed units 102 may be coupled to a manifold (e.g., manifold 106) to distribute the flow of the stream to, from or between components. The adsorbent bed within an adsorbent bed unit may separate one or more contaminants from the feed stream to form a product stream. As may be appreciated, the adsorbent bed units may include other conduits to control other fluid steams as part of the process, such as purge streams, depressurizations streams, and the like. Further, the adsorbent bed unit may also include one or more equalization vessels, such as equalization vessel 108, which are dedicated to the adsorbent bed unit and may be dedicated to one or more step in the swing adsorption process.

As an example, which is discussed further below in FIG. 2, the adsorbent bed unit 102 may include a housing, which may include a head portion and other body portions, that forms a substantially gas impermeable partition, an adsorbent bed disposed within the housing and a plurality of valves (e.g., poppet valves) providing fluid flow passages through openings in the housing between the interior region of the housing and locations external to the interior region of the housing. Each of the poppet valves may include a disk element that is seatable within the head or a disk element that is seatable within a separate valve seat inserted within the head (not shown). The configuration of the poppet valves may be any variety of valve patterns or configuration of types of poppet valves. As an example, the adsorbent bed unit may include one or more poppet valves, each in flow communication with a different conduit associated with different streams. The poppet valves may provide fluid communication between the adsorbent bed and one of the respective conduits, manifolds or headers. The term "in direct flow communication" or "in direct fluid communication" means in direct flow communication without intervening valves or other closure means for obstructing flow. As may be appreciated, other variations may also be envisioned within the scope of the present techniques.

The adsorbent bed comprises a solid adsorbent material capable of adsorbing one or more components from the feed stream. Such solid adsorbent materials are selected to be durable against the physical and chemical conditions within the adsorbent bed unit 102 and can include metallic, ceramic, or other materials, depending on the adsorption process. Further examples of adsorbent materials are noted further below.

Figure 2:
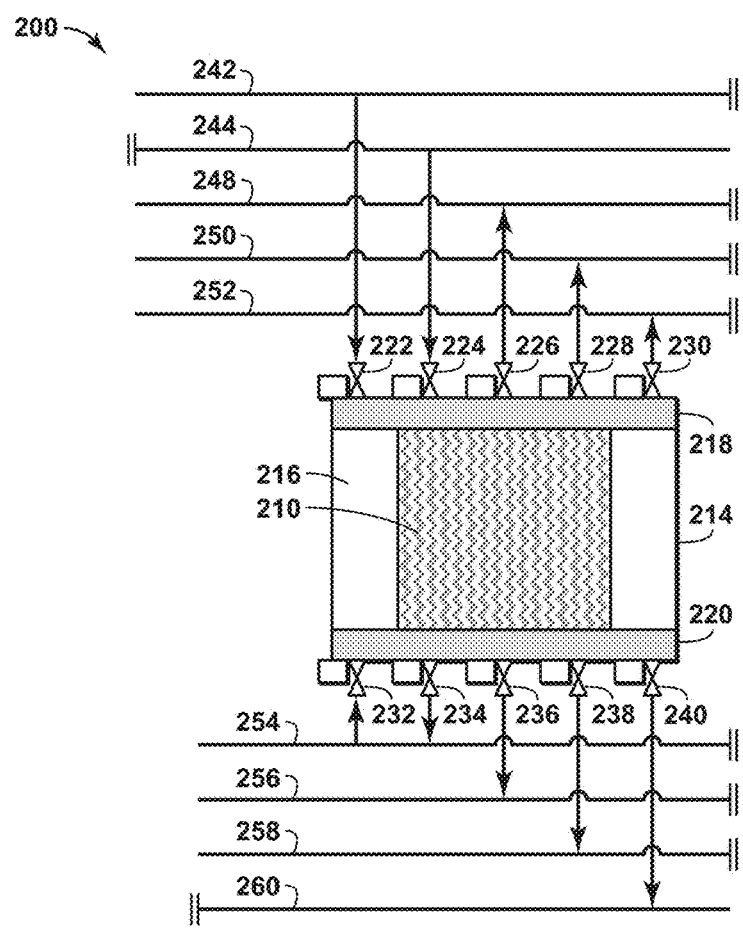
FIG. 2 is a diagram of a portion of an adsorbent bed unit having associated valve assemblies and manifolds in accordance with an embodiment of the present techniques.

FIG. 2 is a diagram 200 of a portion of an adsorbent bed unit having valve assemblies and manifolds in accordance with an embodiment of the present techniques. The portion of the adsorbent bed unit 200, which may be a portion of the adsorbent bed unit 102 of FIG. 1, includes a housing or body, which may include a cylindrical wall 214 and cylindrical insulation layer 216 along with an upper head 218 and a lower head 220. An adsorbent bed 210 is disposed between an upper head 218 and a lower head 220 and the insulation layer 216, resulting in an upper open zone, and lower open zone, which open zones are comprised substantially of open flow path volume. Such open flow path volume in adsorbent bed unit contains gas that has to be managed for the various steps. The housing may be configured to maintain a pressure between 0 bara (bar absolute) or 0.1 bara and 100 bara within the interior region.

The upper head 218 and lower head 220 contain openings in which valve structures can be inserted, such as valve assemblies 222 to 240, respectively (e.g., poppet valves). The upper or lower open flow path volume between the respective head 218 or 220 and adsorbent bed 210 can also contain distribution lines (not shown) which directly introduce fluids into the adsorbent bed 210. The upper head 218 contains various openings (not show) to provide flow passages through the inlet manifolds 242 and 244 and the outlet manifolds 248, 250 and 252, while the lower head 220 contains various openings (not shown) to provide flow passages through the inlet manifold 254 and the outlet manifolds 256, 258 and 260. Disposed in fluid communication with the respective manifolds 242 to 260 are the valve assemblies 222 to 240. If the valve assemblies 222 to 240 are poppet valves, each may include a disk element connected to a stem element which can be positioned within a bushing or valve guide. The stem element may be connected to an actuating means, such as actuating means (not shown), which is configured to have the respective valve impart linear motion to the respective stem. As may be appreciated, the actuating means may be operated independently for different steps in the process to activate a single valve or a single actuating means may be utilized to control two or more valves. Further, while the openings may be substantially similar in size, the openings and inlet valves for inlet manifolds may have a smaller diameter than those for outlet manifolds, given that the gas volumes passing through the inlets may tend to be lower than product volumes passing through the outlets.

In swing adsorption processes, the cycle involves two or more steps that each has a certain time interval, which are summed together to be the cycle time. These steps include regeneration of the adsorbent bed following the adsorption step using a variety of methods including pressure swing, vacuum swing, temperature swing, purging (via any suitable type of purge fluid for the process), and combinations thereof. As an example, a PSA cycle may include the steps of feed or adsorption, depressurization (e.g., blowdown), purging, and re-pressurization. When performing the separation at high pressure, depressurization and re-pressurization (which may be referred to as equalization) may be performed in multiple steps to reduce the pressure change for each step and enhance efficiency. In some swing adsorption processes, such as rapid cycle swing adsorption processes, a substantial portion of the total cycle time is involved in the regeneration of the adsorbent bed. Accordingly, any reductions in the amount of time for regeneration results in a reduction of the total cycle time or cycle curation. This reduction may also reduce the overall size of the swing adsorption system.

As noted above, conventional systems for dehydration is typically accomplished using TSA and PSA molecular sieve process. The conventional systems involves many hours of operation for the molecular sieve unit to both fill with adsorbed species (e.g., water) and to heat for desorption. As a result, the molecular sieve unit are very large (e.g., are a large footprint and involve more adsorbent than the present techniques). To minimize the regeneration gas volume required and to maximize bed capacity, the adsorbent beds of the molecular sieve unit is dried completely (e.g., below the desired product water activity level), which utilizes a purge gas at about 500° F. (260° C.). In addition, the conventional approaches maintain a narrow mass transfer zone, or sharp adsorption front to maximize bed utilization, while maintaining rigorous dehydration. A schematic of the conventional process integrated into an LNG plant is shown below in FIG. 3.

Figure 3:
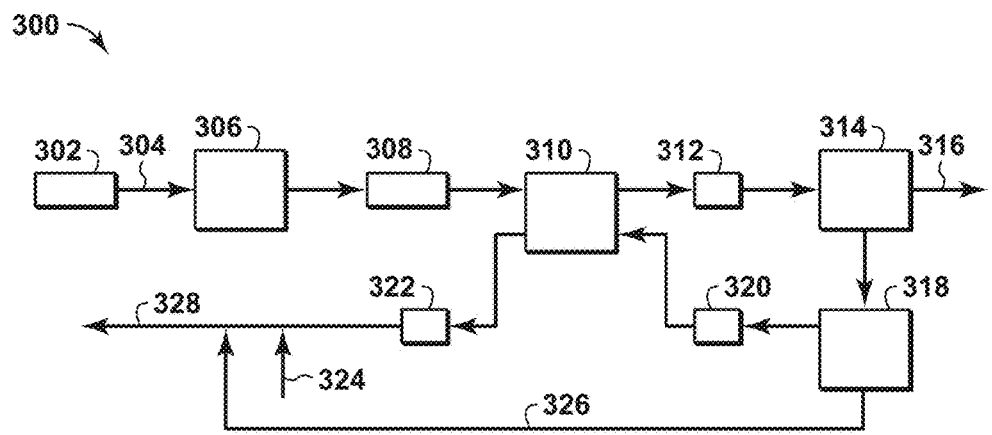
FIG. 3 is a diagram of a conventional system for dehydration of a feed stream to form a liquefied natural gas (LNG) stream.

As an example, FIG. 3 is a diagram of a conventional system 300 for dehydration of a feed stream to form a liquefied natural gas (LNG) stream. As shown in the diagram 300, various equipment, such as units 302, 306, 308, 310, 312, 314, 318, 320 and 322, are utilized to process a feed stream in conduit 304 to produce an output stream, such as a LNG stream in conduit 316.

The process begins at a contamination removal unit 302, which receives an input stream and separates at least a portion of the mercury, carbon dioxide ($CO_2$), hydrogen sulfide ($H_2S$) from the input stream. The output stream from the contamination removal unit 302 is a feed stream, which is provided via conduit 304 to a heat exchanger 306. The heat exchanger 306 is utilized to adjust the temperature of the feed stream, and may also be configured to remove a portion of the water from the stream. For example, the heat exchanger may lower the temperature of the feed stream, which results in condensation, which is conducted away from the stream. The output from the heat exchanger 306 is provided to a filter 308. The filter 308 is configured to remove both particulate and liquid droplets from the temperature adjusted feed stream. Then, the output from the filter 308 is provided to the molecular sieve unit 310. The molecular sieve unit 310 is configure to separate additional contaminants, such as water from the stream. The dehydrated output from the molecular sieve unit 310 is conveyed to a heat exchanger 312, which adjusts the temperature of the stream before being passed to the LNG process unit 314. The output stream from LNG unit 314 is a final product conveyed to sales, storage and/or shipment.

An additional stream from the LNG unit 314 may be a flash fuel stream used within the process. For example, the addition stream from the LNG unit 314 is a lower pressure high purity methane side stream, which may be provided to the fuel gas compressor unit 318. The additional stream may be referred to as a flash fuel stream, flash gas, flash/fuel gas, or end flash gas. A portion of the compressed fuel output stream from the fuel gas compressor unit 318 is heated in a heating unit 320, which may be a furnace or heat exchanger unit, and is configured to thermally swing the temperature for desorption of the molecular sieve unit 310. This stream is output from molecular sieve unit 310 and passed through a heat exchanger unit 322 to cool (e.g., lower the temperature of the stream) the stream and may also be configured to remove a portion of the water from the stream. This heated stream may be combined with any remaining output of the fuel gas compressor unit 318 in conduit 326 and a boil off gas from conduit 324, if any, to form a fuel stream in conduit 328.

The above configuration involves using fuel gas as the purge stream for the molecular sieve unit 310. Alternatively, the conventional approach may include a temperature swing adsorption process and may be configured to use a dry gas for regeneration and to recycle the wet regeneration gas from a compressor to the feed gas. However, this approach may increase the operation costs and the high regeneration hot gas flow rate (e.g., gas temperature equal to or greater than 500° F. (260° C.)).

As an example, the feed stream may be provided at a flow rate of 750 million standard cubic feet per day (MSCFD), at a temperature of about 86° F. (30° C.) and at a pressure of about 1,175 pounds per square inch absolute (psia). The feed stream may include primarily methane along with other heavier hydrocarbons and contaminants. In particular, the methane ($C_1$) may be about 92 volume percent (vol. %), the other hydrocarbons ($C_{2+}$) may be about 8 vol. %, the hydrogen sulfide $H_2S$ may be about 4 ppm, carbon dioxide may be about $CO_2$ of 50 ppm and the water may be about $H_2O$ of 34 pounds per million standard cubic feet (lb/MSCF). The heat exchanger 306 may adjust the temperature of the feed stream from about 86° F. to about 68° F. (20° C.), which may also lessen the water to 19 lb/MSCF. The stream passed from the molecular sieve unit 310, which is conveyed through the heat exchanger 312, to the LNG process unit 314 may have a flow rate of 750 MSCFD, at a temperature of 68° F. (20° C.) and pressure of 1,150 psia. This stream may include less than about 0.1 ppm of water. Then, the output stream from the conduit 316 may be at 5.2 million ton per annum (MTA).

The flash fuel stream provided to the fuel gas compressor unit 318 may be provided at a flow rate of 52 MCSFD, which may be about 7% of the stream volume provided to the LNG process unit 314. From the fuel gas compressor unit 318, the additional fuel stream in conduit 326 may be 27 MSCF (e.g., 4 volume % of the stream provided to the LNG process unit 314), while the stream passed through the heat exchanger 320 to the molecular sieve unit 310 may be 25 MSCFD (e.g., 3 volume % of the stream provided to the LNG process unit 314). The stream to the molecular sieve unit 310 may be at a temperature of 550° F. (287.8° C.) and at a pressure of 665 psia. From the molecular sieve unit 310, the stream conveyed to the heat exchanger 322 may be at a flow rate of 25 MSCF (e.g., 3 volume % of the stream provided to the LNG process unit 314) and at a pressure of 600 psia. Also, the boil off gas stream in conduit 324 may be provided at a flow rate of 19 MSCGD (e.g., 2.5 volume % of the stream provided to the LNG process unit 314).

As noted in this example, the purge stream from the fuel gas compressor unit 318 is provided at an elevated temperature of 550° F. (287.8° C.). This high temperature purge stream may result in hydrothermal degradation of the adsorbent particles and coke formation within the adsorbent bed leading to deactivation and associated downtime.

Further, in this configuration, the purge stream contains a portion of the feed stream. For example, if the feed quantity is 750 MSCFD to the molecular sieve unit 310, the purge stream is flash gas at 25 MSCFD. As the compositions of all the streams are substantially similar (e.g., without a portion of the water content), the mass of the feed stream used in the purge stream may be estimated to be approximately 3.3% (e.g., 25 MSCFD/750 MSCFD) the mass of the feed to the molecular sieve process. In this calculation, the concentrations of $H_2S$, $CO_2$ and $H_2O$ are not considered.

Figure 4:
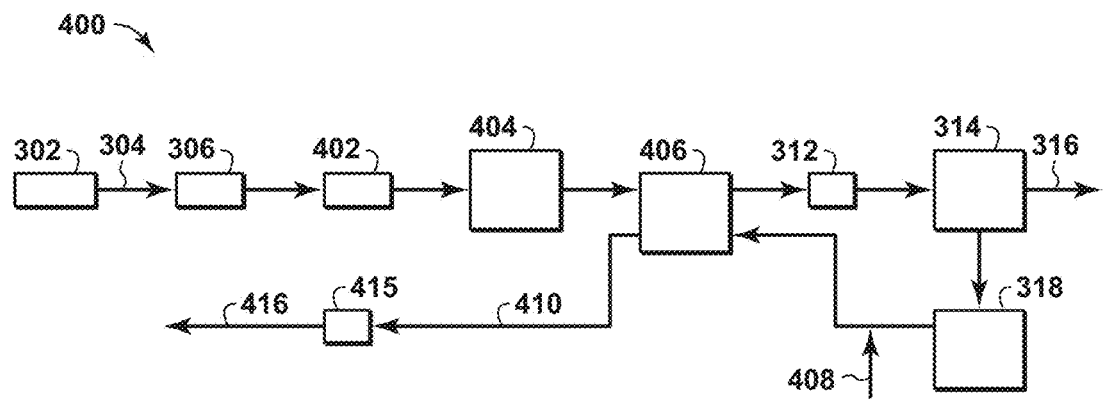
FIG. 4 is an exemplary diagram for dehydration of a feed stream to form a liquefied natural gas (LNG) stream in accordance with an embodiment of the present techniques.

As an enhancement, FIG. 4 is an exemplary diagram 400 for dehydration of a feed stream to form a liquefied natural gas (LNG) stream in accordance with an embodiment of the present techniques. As the quantity of adsorbent materials vary linearly with the cycle time, the present techniques provide adsorbent bed units and components that involve a smaller footprint as compared to conventional systems, such as the configuration noted in FIG. 3. Further, while certain units may be utilized in a manner similar to that noted above, this configuration includes a filter 404 and adsorbent bed unit 406, which are utilized to lessen contamination of the feed stream instead of a molecular sieve unit.

Similar to the process in FIG. 3, the process begins at a contamination removal unit 302, which receives a stream and separates mercury, carbon dioxide ($CO_2$), hydrogen sulfide ($H_2S$) from the input stream. The contaminant removal system may utilize swing adsorption processes, compact contacting processes or other suitable processes. The compact contacting processes may include processes described in U.S. Patent Application Publication Nos. 20110168019; 20120238793; 20140123620; 20140331862; 20140335002; and 20150352463 and U.S. Ser. Nos. 14/948,422; 15/004,348 and 15/009,936, which are each herein incorporated by reference in their entirety. The output stream from the contamination removal unit 302 is a feed stream provided via conduit 304 to a heat exchanger that provides for liquid water removal 306. The heat exchanger 306 is utilized to adjust the temperature of the feed stream and to remove water to its saturation condition at slightly below the desired feed temperature. The output from heat exchanger unit 306 is conveyed to a heat exchanger 402, which may be a second heat exchanger, that is configured to heat the stream a predetermined amount (e.g., at least a few degrees) to lessen the percent humidity to less than 100% and avoid or lessen the risk of water condensation during the swing adsorption and desorption process. The output from heat exchanger 402 is conveyed to a filter unit 404. The filter unit 404 is configured to remove particulate and/or liquid droplets from the stream. The output from the filter 404 is conveyed to an adsorbent bed unit 406, which may include one or more adsorbent bed units configured to remove contaminants from the stream. The adsorbent bed unit 406 may be configured to operate a rapid cycle swing adsorption process. The adsorbent bed unit 406 may be configured to remove a sufficient portion of the $H_2O$ from the stream, such as less than 0.1 ppm. Following adsorbent bed unit 406, the product output of the adsorbent bed unit 406 is cooled in heat exchanger unit 312, which is then fed into the LNG process unit 314.

In this configuration, the flash fuel stream is provided to the fuel gas compressor unit 318. The fuel gas compressor unit 318 compresses the low pressure high purity methane stream to increase the pressure of the resulting stream. Then, the output of fuel gas compressor unit 318 is combined with boil off gas stream provided via conduit 408 to form the purge stream. The purge stream is provided to the adsorbent bed unit 406 as the purge gas in the swing adsorption process. The purge stream combines with contaminants (e.g., water) in the adsorbent bed unit 406 to form the output purge stream. The output purge stream may be conducted away from the adsorbent bed unit 406 toward the heat exchange 415. The heat exchanger 415 is configured to adjust the temperature of the stream and may also be configured to remove a portion of the water from the stream. Then, the conditioned stream is provided as a process fuel gas stream via conduit 416.

This configuration utilizes a purge stream that is at lower temperatures compared to conventional molecular sieve approaches. As an example, the configuration may be utilized to treat 750 MSCFD of wet feed, which involves using four adsorbent bed unit. Each of these adsorbent bed units, which are represented by adsorbent bed unit 406, may have a 0.25 meter (m) diameter and may be 0.6 m in length. In this example, each bed is composed of parallel channels 500 by 500 micron in diameter separated by 50 micron steel walls and coated with a 60 micron layer of porous adsorbent. In this example, the typical heat capacity of the adsorber bed was 3.0 Joules per gram adsorbent per degree Kelvin (J/g adsorbent/K). Each bed contains a total of 22.1 kg of adsorbent for a total of 88.4 kg require for the entire process. In addition, the present techniques do not require a narrow mass transfer zone, thus a wide range of adsorbents can be used for rigorous water removal. These include but are not limited to silica gel, Zeolite 3A, 4A and 5A.

As an example, the feed stream may be provided at 750 MSCFD, at a temperature of about 86° F. and at a pressure of about 1,175 pounds per square inch absolute (psia). The feed stream may include primarily methane along with other hydrocarbons and contaminants. In particular, the methane ($C_1$) may be about 92 vol. %, the other hydrocarbons ($C_{2+}$) may be about 8 vol. %, the hydrogen sulfide $H_2S$ may be about 4 ppm, carbon dioxide may be about $CO_2$ of 50 ppm and the water may be about $H_2O$ of 34 pounds per standard cubic feet (lb/MSCF). The heat exchanger 306 may adjust the temperature of the feed stream from about 86° F. (30° C.) to about 68° F. (20° C.), which may also lessen the water to 19 lb/MSCF. The stream is then passed through the second heat exchanger to adjust the temperature to 73° F. (22.8° C.), which is subsequently passed to the filter 404 and adsorbent bed unit 406. Then, the output from the adsorbent bed unit 406 is conveyed through the heat exchanger 312 to the LNG process unit 314. This stream may have a flow rate of 750 MSCFD, at a temperature of 68° F. (20° C.) and at a pressure of 1,150 psia. This stream may include less than about 0.1 ppm of water. Then, the output stream from the conduit 316 may be at 5.2 MTA.

The flash fuel stream provided to the fuel gas compressor unit 318 may be provided at a rate of 50 MCSFD, which may be about 6.7 volume % of the stream provided to the LNG process unit 314. The output from the fuel gas compressor unit 318 may be combined with the boil off gas (e.g., 11 MSCFD, which is 1.5 volume % of the stream provided to the LNG process unit 314) and provided to the adsorbent bed unit 406 as the purge stream. The purge stream may be provided at a flow rate of 61 MSCFD (e.g., 3 volume % of the stream provided to the LNG process unit 314), at a temperature of 336° F. (168.9° C.) and at a pressure of 622 psia. From the adsorbent bed unit 406, the purge output stream is conveyed to the heat exchanger 415 (e.g., purge heat exchanger) and may be at a flow rate of 63 MSCFD (e.g., 8.4 volume % of the stream provided to the LNG process unit 314) at a temperature of about 240° F. (115.6° C.) and at a pressure of 600 psia.

In this configuration, the purge stream contains a portion of the feed stream. For example, if the feed quantity is 750 MSCFD to the adsorbent bed unit 406, the purge stream is a combination of flash gas at 50 MSCFD and boil off gas at 11 MSCFD. As the compositions of all the streams are substantially similar (e.g., without a portion of the water content), the mass of the feed stream used in the purge stream may be estimated to be approximately 8.1% (e.g., 61 MSCFD/750 MSCFD) the mass of the feed to the swing adsorption process. In this calculation, the concentrations of $H_2S$, $CO_2$ and $H_2O$ are not considered.

By way of example, the purge stream may include equal to or less than 20 molar % of the hydrocarbons, such as methane, in the feed stream, equal to or less than 15 molar % of the hydrocarbons, such as methane, in the feed stream, equal to or less than 10 molar % of the hydrocarbons, such as methane, in the feed stream, or equal to or less than 7 molar % of the hydrocarbons, such as methane, in the feed stream. In other examples, the purge stream may include equal to or less than 20 volume % of the feed stream, equal to or less than 15 volume % of the feed stream, equal to or less than 10 volume % of the feed stream, or equal to or less than 7 volume % of the feed stream. In other configurations, the purge stream flow rate may be equal to or less than 20 molar percent (%) of the feed stream flow rate; the purge stream flow rate may be equal to or less than 15 molar % of the feed stream flow rate; or the purge stream flow rate may be equal to or less than 10 molar % of the feed stream flow rate.

Further, the purge stream may include a portion of the feed stream. By way of example, the portion of the methane in the purge stream may be equal to or greater than 1 molar % of the methane in the feed stream; or preferably equal to or greater than 3 molar % of the methane in the feed stream; or preferably equal to or greater than 5 molar % of the methane in the feed stream. Also, the portion of the hydrocarbons in the purge stream may be equal to or greater than 1 molar % of the hydrocarbons in the feed stream; or preferably equal to or greater than 3 molar % of the hydrocarbons in the feed stream; or preferably equal to or greater than 5 molar % of the hydrocarbons in the feed stream. As yet another example, the purge stream flow rate may be equal to or greater than 1 molar percent (%) of the feed stream flow rate; the purge stream flow rate may be equal to or greater than 3 molar % of the feed stream flow rate; or the purge stream flow rate may be equal to or greater than 5 molar % of the feed stream flow rate.

In this diagram 400, the rapid cycle adsorbent beds are regenerated via a purge step with a purge stream, which is heated only by compression. This configuration may remove any heat exchanger or furnace from the purge stream process flow. Further, in this configuration, the purge stream is provided by a combination of the compressed flash fuel stream (e.g., LNG flash gas) and the boil-off gas (BOG) in conduit 408 from the LNG storage tanks (not shown). As the purge stream is at a lower temperature, it may involve less heat than the regeneration stream in the conventional process of FIG. 3.

In another embodiment, the filter 404 may be disposed between the two heat exchangers 306 and 402, downstream of the chiller heat exchanger 306, but upstream of the superheater heat exchanger 402. This configuration may lessen the possibility of liquid droplet carryover into the superheater heat exchanger 402. The purpose of the superheater heat exchanger 402 is to adjust the feed being provided to the adsorbent beds, such that it has less than (<) 100% relative humidity and the carryover of water droplets into the superheat heat exchanger 402 may hinder this purpose.

The enhancements of the present techniques are further illustrated by comparing the two processes. For example, to perform the same dehydration of a feed stream. The process in the conventional TSA molecular sieve process, as noted in FIG. 3, involves three molecular sieve beds, each containing 38,102 kilograms (kg) of zeolite 4A adsorbent for a total of 114,306 kg of adsorbent. The process in the present techniques, as noted in FIG. 4, involves four adsorbent bed units, which each contain 22.1 kg of zeolite 5A adsorbent for a total of 88.4 kg of adsorbent. The amount of adsorbent used in the conventional process is a factor of 1,293 larger than the amount of adsorbent required for the configuration in FIG. 4. Additionally, the units for the conventional TSA molecular sieve process has a diameter of about 1.41 meters (m) and a length of about 6.7 m, while the adsorbent bed units in the present techniques have a diameter of about 0.25 m and length of 0.6 m. Accordingly, the footprint for the present techniques is significantly less than the conventional TSA molecular sieve process.

Figure 5A:
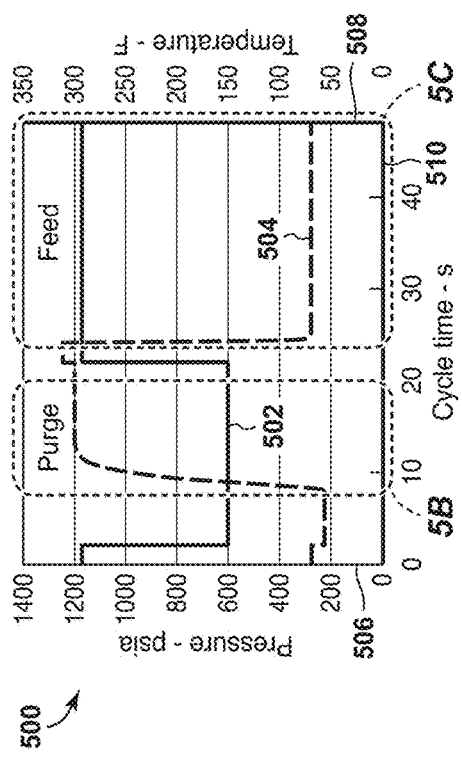
FIGS. 5A, 5B and 5C are exemplary diagrams associated with the configuration in FIG. 4 in accordance with an embodiment of the present techniques.
Figure 5C:
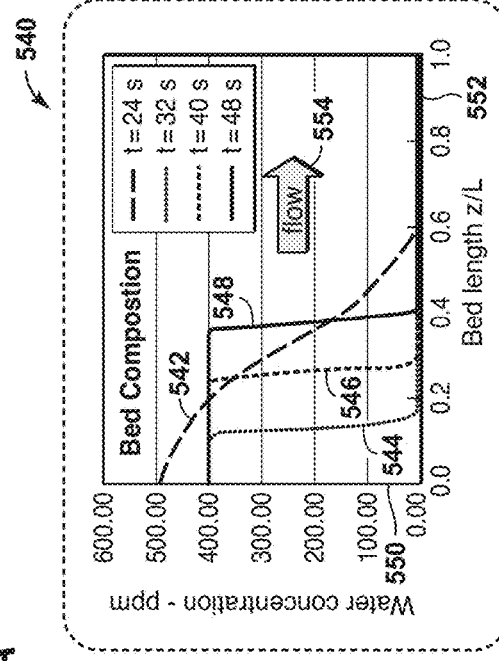
Figure 5B:
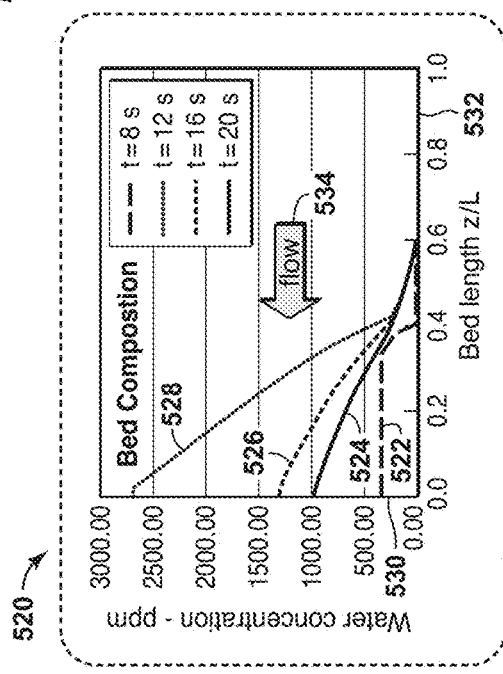

FIGS. 5A, 5B and 5C include exemplary diagrams 500, 520 and 540 associated with the configuration in FIG. 4 in accordance with an embodiment of the present techniques. These diagrams 500, 520 and 540 describe the timing and steps for an exemplary cycle of the swing adsorption process. In diagram 500, the bed pressure response 502 and the bed temperature response 504 are shown along pressure axis 506 in psia, the temperature axis 508 in degrees Fahrenheit (° F.) with respect to the cycle time axis 510 in seconds (s) for the steps in an exemplary cycle. As an example, the cycle in FIGS. 5A, 5B and 5C may include performing a hold step for two second, a blowdown step for six seconds, a purge step for twelve seconds, a second hold step for two seconds, a repressurize step for two seconds and then an adsorption step for twenty-four seconds. The resulting duration for a single cycle in this configuration is forty-eight seconds.

In diagrams 520 and 540 the water concentration of the bed gas compositions are shown relative to the bed length. The response on these diagrams 520 and 540 are the water concentration in the gas phase and do not include the amount of water adsorbed in the solid adsorbent. In particular, the diagram 520 is an expanded view of the purge step performed in diagram 500. In this diagram 520, the responses 522, 524, 526 and 528 are shown along a water concentration axis 530 in ppm and a bed length axis 532 in normalized position along the bed length (e.g., normalized bed length (z/L)). The flow of the stream for the purge step is along the arrow 534. The response 522 represents eight seconds into the cycle, the response 524 represents twelve seconds into the cycle, the response 526 represents sixteen seconds into the cycle and the response 528 represents twenty seconds into the cycle. These responses shows the progression of the water removal from the bed during the purge step. Further, the diagram 540 is an expanded view of the adsorption step performed in diagram 500. In this diagram 540, the responses 542, 544, 546 and 548 are shown along a water concentration axis 550 in ppm and a bed length axis 552 in normalized bed length z/L. The flow of the stream for the purge step is along the arrow 554. The response 542 represents twenty-four eight seconds into the cycle, the response 544 represents thirty-two seconds into the cycle, the response 546 represents forty seconds into the cycle and the response 548 represents forty-eight seconds into the cycle. Further, the diagram 540 represents that on average only about 80% of the available bed length is utilized for adsorption.

Figure 6A:
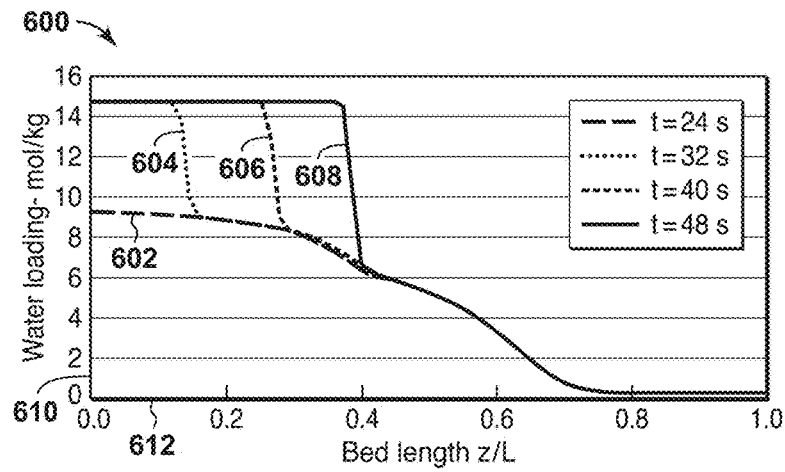
FIGS. 6A, 6B and 6C are exemplary diagrams associated with the configuration in FIG. 4 in accordance with an embodiment of the present techniques.
Figure 6B:
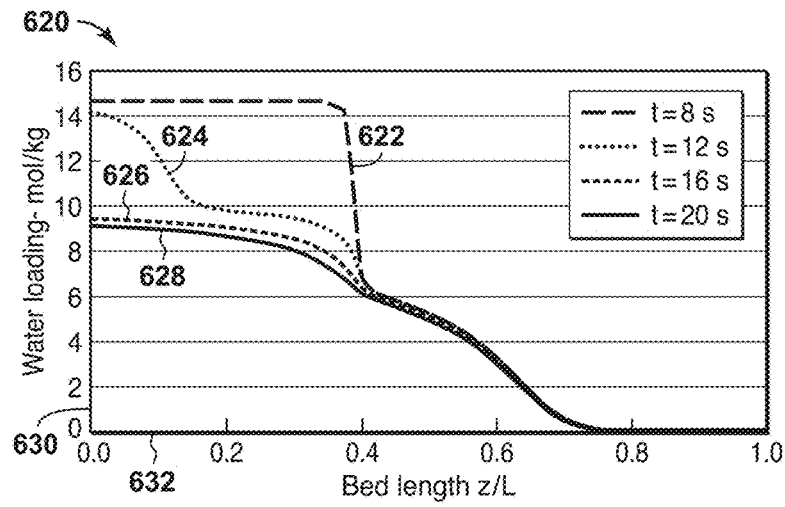
Figure 6C:
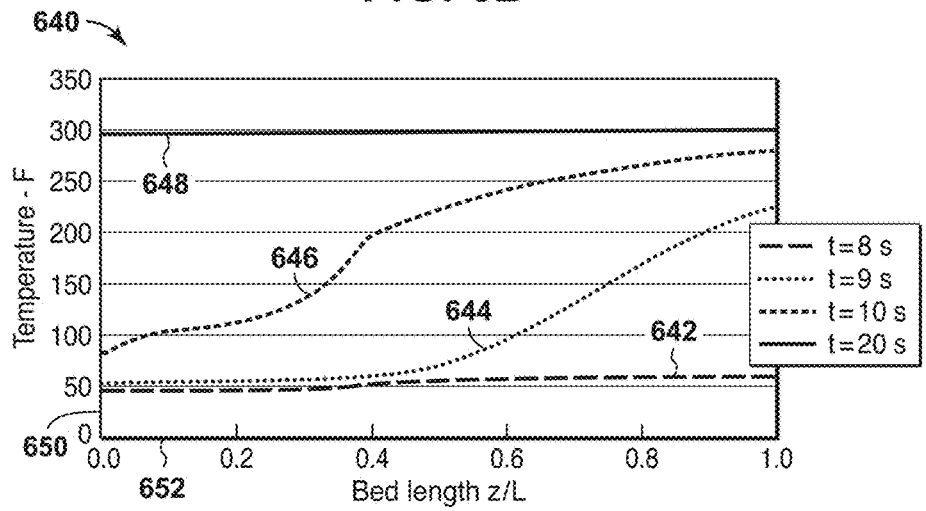

FIGS. 6A, 6B and 6C are exemplary diagrams 600, 620 and 640 associated with the configuration in FIG. 4 in accordance with an embodiment of the present techniques. In particular, these diagrams relate to the cycle timing described in diagram 500. These diagrams 600 and 620 further describe water loading of the bed and diagram 640 describes the temperature profiles of the bed for the timing of the steps in an exemplary cycle of the swing adsorption process. In diagram 600, the water loading responses 602, 604, 606 and 608 are shown along water loading axis 610 in moles per kilogram (mol/kg) with respect to the bed length axis 612 in normalized bed length (z/L). The response 602 represents twenty-four seconds into the cycle, the response 604 represents thirty-two seconds into the cycle, the response 606 represents forty seconds into the cycle and the response 608 represents twenty seconds into the cycle. Each of these responses 602, 604, 606 and 608 are the water loading at the various times during the adsorption step. The leading edge of the adsorption front for each of the responses 602, 604, 606 and 608 does not increase in the latter region of the adsorbent bed. In particular, for this example, the product region of the adsorbent bed is the portion of the absorbent bed from the product end to about 25% of the bed length from the product end of the adsorbent bed and is maintained with a water loading for the product region less than about 1 mole per kilogram (mol/kg).

In diagram 620, the water loading responses 622, 624, 626 and 628 are shown along water loading axis 630 in mol/kg with respect to the bed length axis 632 in z/L. The response 622 represents eight seconds, the response 624 represents twelve seconds, the response 626 represents sixteen seconds and the response 628 represents twenty seconds and shows the progression of the water loading from the adsorbent bed during the purge step. As shown on this diagram 620, the water loading decreases as the purge step continues from the initial time of eight seconds (e.g., response 622) to the end of the purge step at time of twenty seconds (e.g., response 628). For the duration of this purge step, the water loading for the product region, as defined in FIG. 6A, is less than about 1 mol/kg.

In this configuration, purge step removes water from the adsorbent bed. For example, the highest content of water is at the end of the adsorption step (e.g., response 608), while the lowest content of water is at the end of the purge step (e.g., response 628). As such, the concentration of water adsorbed on the feed end of the adsorbent bed is the difference between the response 608 at the feed end of the adsorbent bed and the response 628 at the feed end of the adsorbent bed divided by the response 608, which is about 40% (e.g., (15 mol/kg-9 mol/kg) divided by 15 mol/kg). Accordingly, the concentration of water at the feed end of the adsorbent bed adsorbed on the adsorbent bed may be at least 40% of the concentration of water adsorbed on the feed end of the adsorbent bed at the end of the duration of adsorption step; may be at least 30% of the concentration of water adsorbed on the feed end of the adsorbent bed at the end of the duration of adsorption step or may be at least 20% of the concentration of water adsorbed on the feed end of the adsorbent bed at the end of the duration of adsorption step.

In diagram 640, the water loading response 642, 644, 646 and 648 are shown along the temperature axis 650 in ° F. with respect to the bed length axis 652 in z/L. The response 642 represents eight seconds into the cycle, the response 644 represents twelve seconds into the cycle, the response 646 represents sixteen seconds into the cycle and the response 648 represents twenty seconds into the cycle. These responses show the progression of the temperature of the adsorbent bed during the purge step. As shown on this diagram 640, the temperature of the adsorbent bed increases as the purge step continues from the initial time of eight seconds (e.g., response 642) to the end of the purge step at time of twenty seconds (e.g., response 648).

Further, in another example, the configuration may include an integration with a Controlled Freeze Zone™ (CFZ) process for bulk $CO_2$ removal from natural gas. See, e.g., U.S. Patent Application Nos. 2009/0266107 and 2010/0018248. The cryogenic controlled freeze zone is a cryogenic distillation process that separates methane from gas streams containing large amounts of $CO_2$. The system includes a refluxed demethanizer with a freeze zone in the middle to facilitate freezing and re-melting of the $CO_2$, as is known by one skilled in the art. A demethanizer overhead stream (e.g., a clean vapor methane stream) is obtained as the top product from the demethanizer of the CFZ process, while a final product stream (e.g., high pressure acid liquid product) is obtained as the bottoms product. Any heavier hydrocarbons in the feed to the CFZ recovery system are also removed as the bottoms product. For this process, dehydration is necessary upstream of the cryogenic CFZ recovery system to ensure that hydrates do not form in the cryogenic equipment.

The dehydration of the feed stream for the cryogenic CFZ recovery system may the use rapid cycle swing adsorption processes and units to dehydrate this stream. In the cryogenic controlled freeze zone recovery system, various steps may be utilized to dehydrate the stream. For example, the steps may be similar to the steps used in a configuration of FIG. 4. As noted above for FIG. 4, the purge stream may be provided within a specific temperature range, which may be a portion of one of the streams from the CFZ process, such as the vapor methane stream. This purge stream may be provided at pressures in the range between 450 psia and 650 psia. As an example of the dehydration process steps, the adsorbent bed unit is initially repressurized and then a feed stream is dehydrated in an adsorption step. Following the adsorption step, the adsorbent bed is subjected to various regeneration steps. The regeneration steps include one or more blowdown steps, which each may lessen the pressure within the adsorbent bed unit and the final pressure may be slightly below the purge pressure. Following the blowdown steps, one or more purge steps may be performed, wherein each purge step may be provided in a counter current flow direction relative to the feed stream flow direction. The purge stream, which may be a primarily methane stream, may remove the contaminants from the adsorbent bed. In certain configurations, heat may also be added to the process to further enhance the process.

In one or more embodiments, the material may include an adsorbent material supported on a non-adsorbent support. Non-limiting examples of adsorbent materials may include alumina, microporous zeolites, carbons, cationic zeolites, high silica zeolites, highly siliceous ordered mesoporous materials, sol gel materials, aluminum phosphorous and oxygen (ALPO) materials (microporous and mesoporous materials containing predominantly aluminum phosphorous and oxygen), silicon aluminum phosphorous and oxygen (SAPO) materials (microporous and mesoporous materials containing predominantly silicon aluminum phosphorous and oxygen), metal organic framework (MOF) materials (microporous and mesoporous materials comprised of a metal organic framework) and zeolitic imidazolate frameworks (ZIF) materials (microporous and mesoporous materials comprised of zeolitic imidazolate frameworks). Other materials include microporous and mesoporous sorbents functionalized with functional groups. Examples of functional groups, which may be used for $CO_2$ removal, may include primary, secondary, tertiary amines and other non protogenic basic groups such as amidines, guanidines and biguanides.

In one or more embodiments, the adsorbent bed unit may be utilized to separate contaminants from a feed stream. The method may include passing a gaseous feed stream at a feed pressure through an adsorbent bed unit having an adsorbent contactor to separate one or more contaminants from the gaseous feed stream to form a product stream, wherein the adsorbent contactor has a first portion and a second portion; interrupting the flow of the gaseous feed stream; performing a depressurization step, wherein the depressurization step reduces the pressure within the adsorbent bed unit; performing a purge step, wherein the purge step reduces the partial pressure of the adsorbate within the adsorbent bed unit and wherein the purge step involves passing a purge stream to a mid-purge distribution zone between first portion and the second portion; performing a re-pressurization step, wherein the re-pressurization step increases the pressure within the adsorbent bed unit; and repeating the steps a) to e) for at least one additional cycle.

Further, in one or more embodiments, the adsorbent bed unit may include an adsorbent bed that can be used for the separation of a target gas form a gaseous mixture. The adsorbent is usually comprised of an adsorbent material supported on a non-adsorbent support, or contactor. Such contactors contain substantially parallel flow channels wherein 20 volume percent, preferably 15 volume percent or less of the open pore volume of the contactor, excluding the flow channels, is in pores greater than about 20 angstroms. A flow channel is taken to be that portion of the contactor in which gas flows, if a steady state pressure difference is applied between the point or place at which a feed stream enters the contactor and the point or place at which a product stream leaves the contactor. In the contactor, the adsorbent is incorporated into the wall of the flow channel.

In one or more embodiments, the rapid cycle swing adsorption process in the present techniques is a rapid cycle temperature swing adsorption (RCTSA) and a pressure swing adsorption (PSA). For RCTSA or combined RCTSA and RCPSA, the total cycle times are typically less than 600 seconds, less than 300 seconds, preferably less than 200 seconds, more preferably less than 100 seconds, and even more preferably less than 60 seconds.

In view of the many possible embodiments to which the principles of the disclosed invention may be applied, it should be recognized that the illustrative embodiments are only preferred examples of the invention and should not be taken as limiting the scope of the invention.

What is claimed is:

1. A process for removing contaminants from a gaseous feed stream, the process comprising:
    a) performing one or more adsorption steps; wherein each of the one or more adsorption steps comprises passing a gaseous feed stream at a feed pressure and a feed temperature through an adsorbent bed unit to separate one or more contaminants from the gaseous feed stream to form a product stream;
    b) performing one or more depressurization steps, wherein the pressure of the adsorbent bed unit is reduced by a predetermined amount with each successive depressurization step;
    c) performing one or more purge steps, wherein each of the one or more purge steps comprise passing a purge stream into the adsorbent bed unit, wherein the purge stream flows countercurrent to the direction of the feed stream, the purge stream is provided at a temperature at least 50° F. above the feed temperature and less than 450° F. and the purge stream flow rate is equal to or less than 20 molar % of the feed stream flow rate;
    d) performing one or more re-pressurization steps, wherein the pressure within the adsorbent bed unit is increased with each re-pressurization step by a predetermined amount with each successive re-pressurization step; and
    e) repeating the steps a) to d) for at least one additional cycle, wherein the cycle duration is for a period greater than 1 second and less than 600 seconds.

2. The process of claim 1, wherein the purge stream is provided in a range between 200° F. and 450° F.

3. The process of claim 1, wherein the purge stream is provided in a range between 250° F. and 380° F.

4. The process of claim 1, wherein the gaseous feed stream is a hydrocarbon containing stream having greater than one volume percent hydrocarbons based on the total volume of the gaseous feed stream.

5. The process of claim 1, wherein the gaseous feed stream comprises hydrocarbons and $H_2O$, wherein the $H_2O$ is in the range of 0.2 parts per million volume to saturation levels in the gaseous feed stream.

6. The process of claim 1, wherein the gaseous feed stream comprises hydrocarbons and $H_2O$, wherein the $H_2O$ is in the range of 100 parts per million volume to 1500 parts per million volume.

7. The process of claim 1, further comprising passing an input stream through a contamination removal unit to form the gaseous feed stream, wherein the contamination removal unit is configured to lower the carbon dioxide ($CO_2$) level to less than 100 parts per million and the hydrogen sulfide ($H_2S$) level to less than 4 parts per million.

8. The process of claim 1, further comprising heating the gaseous feed stream to be above the dew point of water.

9. The process of claim 8, wherein heating the gas feed stream to be above the dew point of water further comprises:
    passing the gaseous feed stream through a first heat exchanger to lower the temperature of the gaseous feed stream;
    conducting away a portion of the $H_2O$ from the gaseous feed stream; and
    passing the gaseous feed stream to a second heat exchanger to increase the temperature of the gaseous feed stream.

10. The process of claim 1, further comprising:
    passing the product stream from the adsorbent bed unit to a liquefied natural gas process unit; and
    separating a flash fuel stream of high purity methane from the LNG process unit to be utilized as at least a portion of the purge stream.

11. The process of claim 1, wherein the feed pressure is in the range between 400 pounds per square inch absolute (psia) and 1,400 psia.

12. The process of claim 1, wherein the cycle duration is greater than 2 seconds and less than 300 seconds.

13. The process of claim 1, wherein at the end of the duration of the purge step, the concentration of water adsorbed on the adsorbent bed is at least 40% of the concentration of water adsorbed on the adsorbent bed at the end of the duration of adsorption step.

14. The process of claim 1, wherein the adsorbent bed unit comprises an adsorbent bed, wherein the $H_2O$ loading for a product region near a product end of the adsorbent bed is less than 0.5 mole per kilogram.

15. The process of claim 14, wherein the product region is a specific portion of the adsorbent bed from the product end of the adsorbent bed to 25% of the bed length.

16. The process of claim 1, wherein the purge stream includes equal to or less than 10 molar % of methane present in the feed stream.

17. A system for removing contaminants from a gaseous feed stream, the system comprising:
    an adsorbent bed unit configured to separate contaminants from a gaseous feed stream and to output a product stream, wherein the gaseous feed stream is provided at a feed temperature;
    a liquefied natural gas process unit configured to receive the product stream and separate the product stream into a final product stream and a flash fuel stream of high purity methane; and
    one or more purge units configured to provide a purge stream to the adsorbent bed unit, wherein the purge stream is provided from one of a portion of the product stream, the flash fuel stream of high purity methane, and any combination thereof; and wherein the purge stream is provided at a temperature at least 50° F. above the feed temperature and less than 450° F. and the purge stream contains equal to or less than 20 molar % of hydrocarbons in the gaseous feed stream;

further comprising:

a first heat exchanger configured to receive the gaseous feed stream; to lower the temperature of the gaseous feed stream; and to conduct away a portion of $H_2O$ from the gaseous feed stream; and a second heat exchanger to increase the temperature of the gaseous feed stream from the first heat exchanger.

18. The system claim 17, further comprising a contamination removal unit configured to receive an input stream and form the gaseous feed stream, wherein the contamination removal unit is configured to lower the carbon dioxide ($CO_2$) level to less than 100 parts per million and the hydrogen sulfide ($H_2S$) level to less than 4 parts per million.

19. The system of claim 17, further comprising a purge heat exchanger configured to receive the purge output stream from the adsorbent bed unit during a purge step; to lower the temperature of the purge output stream; and to conduct away a portion of the $H_2O$ from the purge output stream.

20. The system of claim 17, wherein the water content of the product stream is less than 1 parts per million volume.

21. The system of claim 17, wherein the one or more purge units comprise one or more compressors configured to compress the flash fuel stream of high purity methane.

* * * * *